US010176467B2

(12) United States Patent
Prosperie, III

(10) Patent No.: US 10,176,467 B2
(45) Date of Patent: Jan. 8, 2019

(54) SYSTEM AND METHOD FOR FACILITATING AND PROCESSING CONSUMER TRANSACTIONS AT A GAS PUMP AND FOR MANAGING A FUEL MEDIA NETWORK

(71) Applicant: Gas Pump TV, LLC, Houma, LA (US)

(72) Inventor: Werlien Prosperie, III, Houma, LA (US)

(*) Notice: Subject to any disclaimer, the term of this patent is extended or adjusted under 35 U.S.C. 154(b) by 316 days.

(21) Appl. No.: 14/949,321

(22) Filed: Nov. 23, 2015

(65) Prior Publication Data

US 2016/0148181 A1 May 26, 2016

Related U.S. Application Data

(60) Provisional application No. 62/083,024, filed on Nov. 21, 2014, provisional application No. 62/086,344, filed on Dec. 2, 2014, provisional application No. 62/086,752, filed on Dec. 3, 2014, provisional application No. 62/086,755, filed on Dec. 3, 2014, provisional application No. 62/086,757, filed on Dec. 3, 2014, provisional application No. 62/094,102, filed on Dec. 19, 2014.

(51) Int. Cl.
| | |
|---|---|
| *G06Q 20/18* | (2012.01) |
| *B05B 11/00* | (2006.01) |
| *G07F 9/02* | (2006.01) |
| *G07F 13/02* | (2006.01) |

(52) U.S. Cl.
CPC .............. *G06Q 20/18* (2013.01); *B05B 11/00* (2013.01); *G07F 9/023* (2013.01); *G07F 13/025* (2013.01)

(58) Field of Classification Search
CPC ........ G06Q 20/20; G06Q 30/06; G06Q 20/18; G07G 1/12; G07F 9/023; G07F 13/025; B05B 11/00
USPC ...... 705/16, 5, 14.58, 14.65, 20, 23; 141/59, 141/94, 98; 222/321.7; 235/383–385, 235/487, 492; 463/25, 30–34
See application file for complete search history.

(56) References Cited

U.S. PATENT DOCUMENTS

| | | | | |
|---|---|---|---|---|
| 5,835,861 | A * | 11/1998 | Whiteside | ....... H04M 1/274516 340/905 |
| 6,783,028 | B1 * | 8/2004 | Ambrose | ............... B67D 7/426 141/392 |

(Continued)

*Primary Examiner* — Andrew Joseph Rudy
(74) *Attorney, Agent, or Firm* — Warner J. Delaune; Baker, Donelson, et al.

(57) ABSTRACT

A system for managing and processing a consumer transaction is provided, comprising a gas fuel pump, a high-definition video display topper affixed to the gas fuel pump, a consumer interface screen affixed to the gas fuel pump, wherein the interface screen is in electronic communication with the video display topper, prompts the consumer to engage in a consumer transaction or opportunity, and receives input from said consumer when the consumer engages in said transaction or opportunity. The system may include a fuel media network, the network providing campaign, retailer, advertiser, affiliate, and manager functions and interfaces. The system may also include a media display unit with a storage device for media, a transmitter, a cooling system, and a back-up battery; wherein the media display unit is adapted to provide media distribution and content deliver to one or more high-definition video display toppers affixed to one or more gas fuel pumps.

3 Claims, 42 Drawing Sheets

(56) References Cited

U.S. PATENT DOCUMENTS

| | | | | |
|---|---|---|---|---|
| 6,837,427 B2* | 1/2005 | Overhultz | | G06Q 10/02 |
| | | | | 235/375 |
| 7,107,231 B1* | 9/2006 | Hall | | G06Q 30/02 |
| | | | | 705/14.27 |
| 7,374,096 B2* | 5/2008 | Overhultz | | G06Q 30/02 |
| | | | | 235/383 |
| 7,450,954 B2* | 11/2008 | Randall | | H04M 19/04 |
| | | | | 455/403 |
| 7,740,243 B1* | 6/2010 | Kean | | G07F 17/329 |
| | | | | 273/139 |
| 7,946,915 B2* | 5/2011 | Cannon | | G07F 17/32 |
| | | | | 273/263 |
| 8,142,276 B1* | 3/2012 | Gianti, Jr. | | G07F 17/3293 |
| | | | | 273/292 |
| 8,186,084 B2* | 5/2012 | Brown | | B67D 7/426 |
| | | | | 141/98 |
| 8,528,811 B2* | 9/2013 | Stoudt | | G06Q 20/20 |
| | | | | 235/380 |
| 8,939,361 B2* | 1/2015 | Stoudt | | G06Q 20/34 |
| | | | | 235/380 |
| 8,983,137 B2* | 3/2015 | Hradetzky | | G06Q 30/0269 |
| | | | | 382/104 |
| 9,165,449 B2* | 10/2015 | Ribble | | A61B 5/746 |
| 9,378,620 B2* | 6/2016 | Soong | | G07F 17/3258 |
| 9,892,588 B2* | 2/2018 | Jadeja | | G07F 17/3211 |
| 9,972,159 B2* | 5/2018 | Carapelli | | G06Q 20/18 |
| 2007/0221288 A1* | 9/2007 | Olesen | | B67D 7/22 |
| | | | | 141/94 |
| 2008/0065475 A1* | 3/2008 | Phan | | G06Q 20/20 |
| | | | | 705/14.23 |
| 2011/0282727 A1* | 11/2011 | Phan | | G06Q 10/10 |
| | | | | 705/14.36 |

* cited by examiner

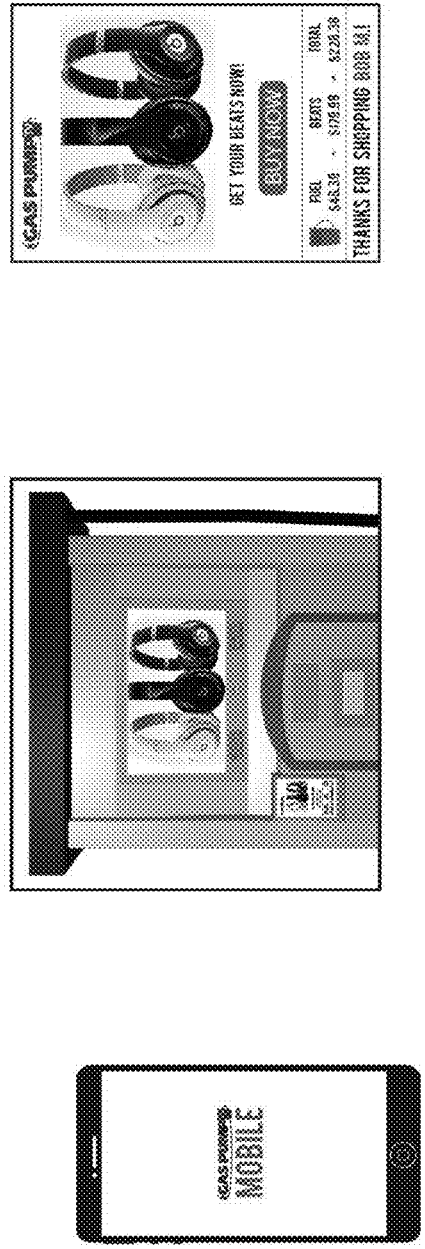
FIG. 7

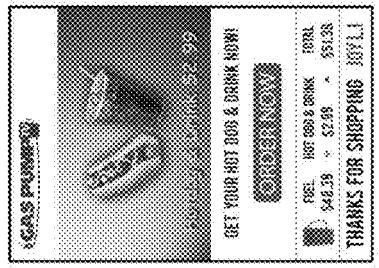
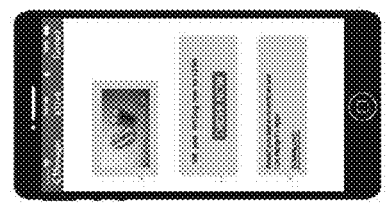
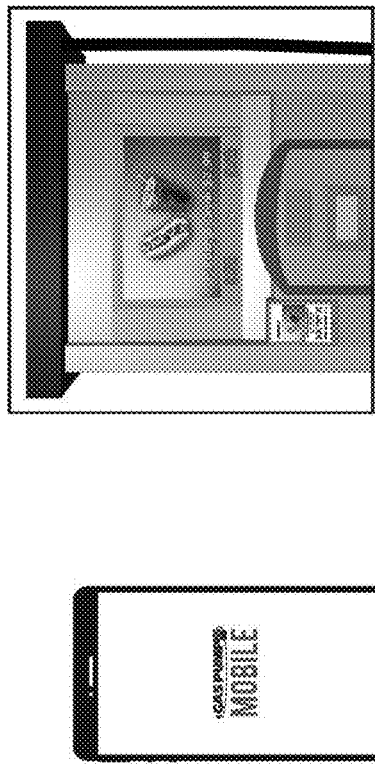
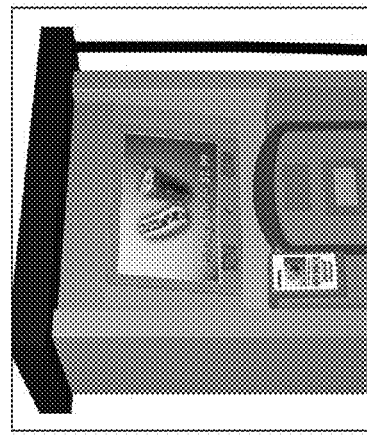
FIG. 8

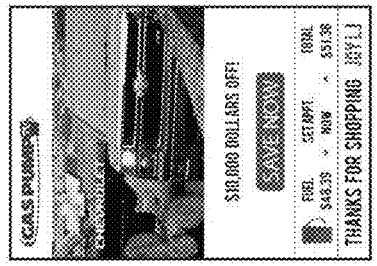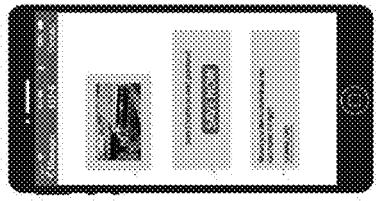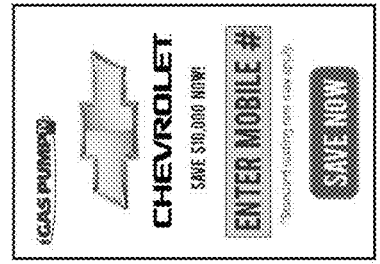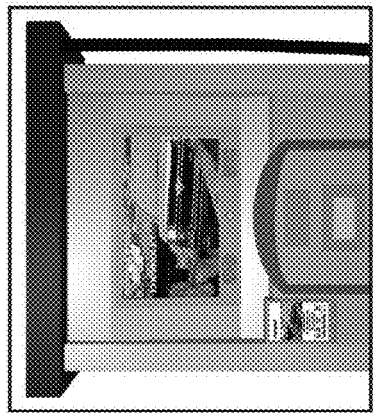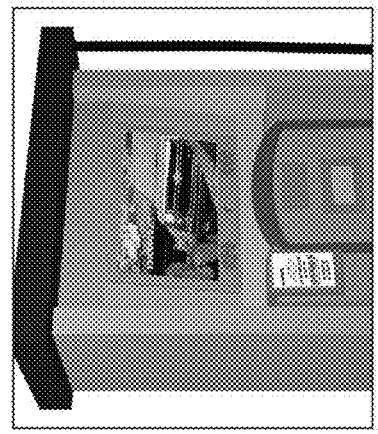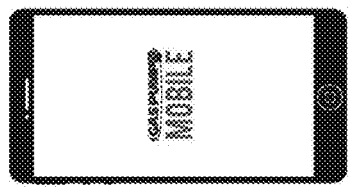
FIG. 9

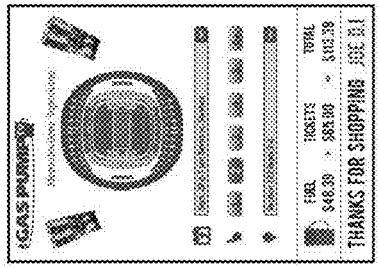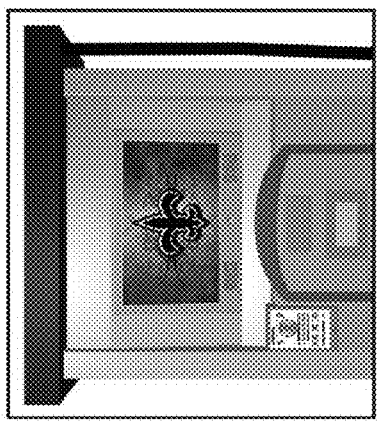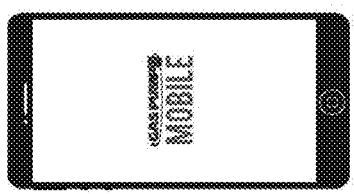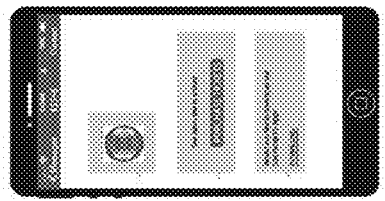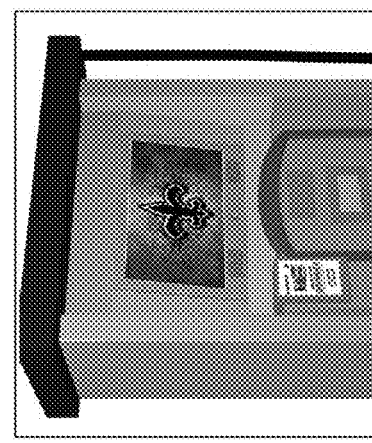
FIG. 10

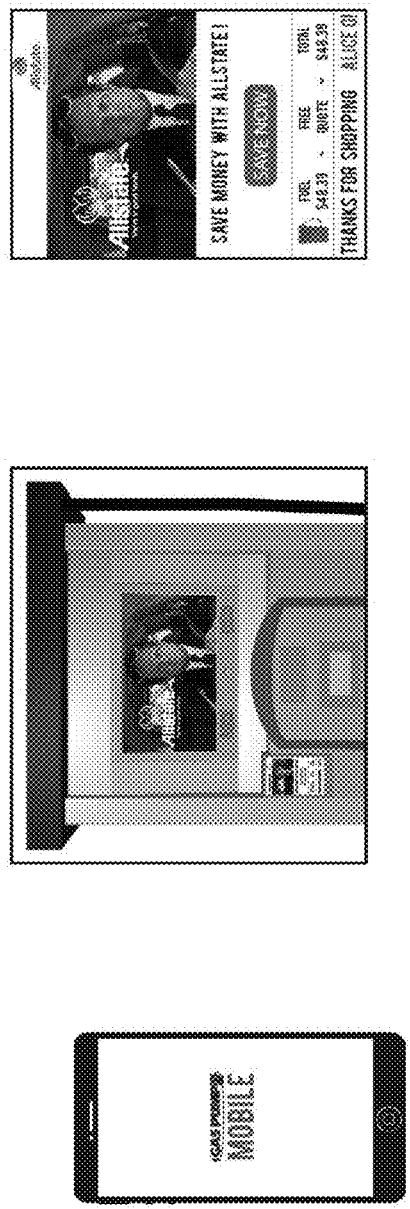
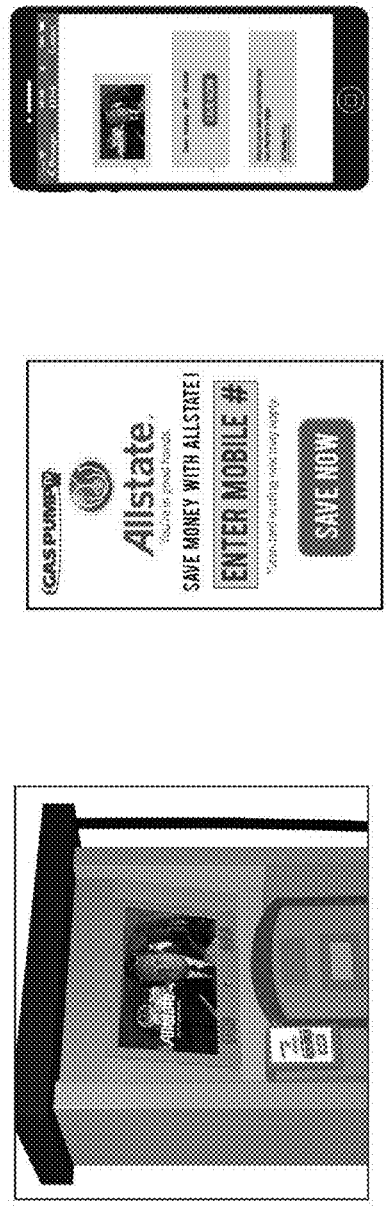
FIG. 11

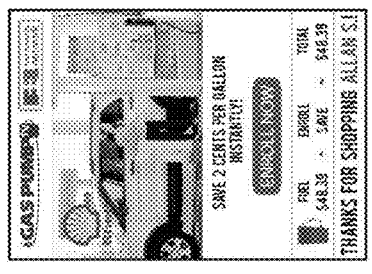
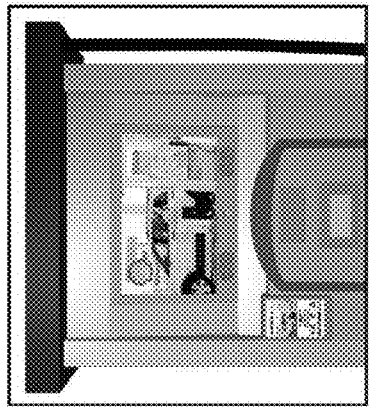
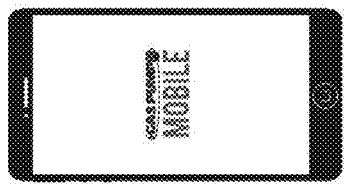
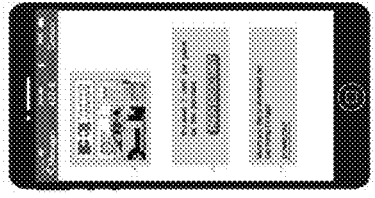
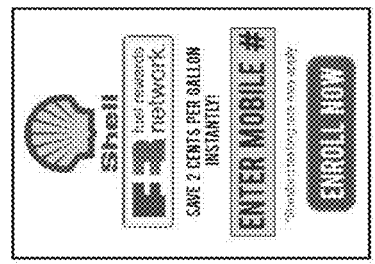
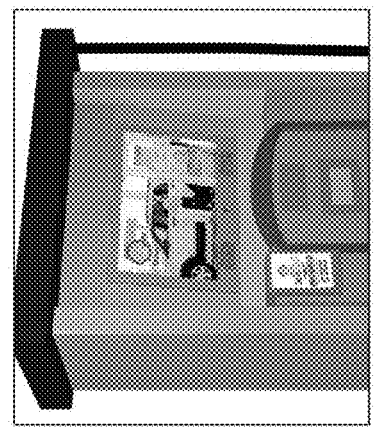
FIG. 12

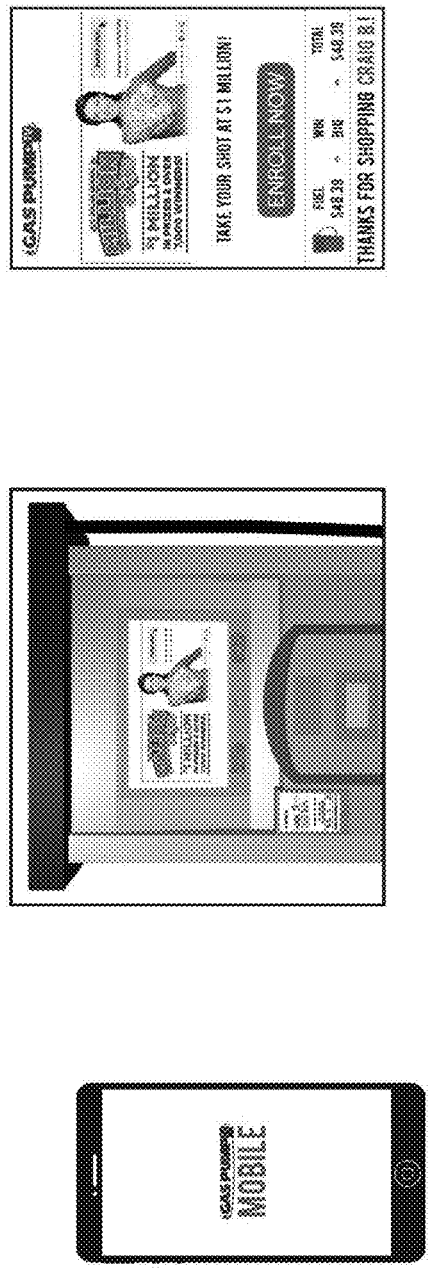
FIG. 13

SYSTEM AND METHOD FOR FACILITATING AND PROCESSING CONSUMER TRANSACTIONS AT A GAS PUMP AND FOR MANAGING A FUEL MEDIA NETWORK

CROSS-REFERENCE TO RELATED APPLICATIONS

This nonprovisional patent application claims the benefit of priority to the following U.S. provisional applications: Ser. No. 62/083,024, filed on Nov. 21, 2014; Ser. No. 62/086,344, filed on Dec. 2, 2014; Ser. No. 62/086,752, filed on Dec. 3, 2014; Ser. No. 62/086,755, filed on Dec. 3, 2014; Ser. No. 62/086,757, filed on Dec. 3, 2014; and Ser. No. 62/094,102, filed on Dec. 19, 2014.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

1. Field of the Invention

This invention relates to an apparatus and system for facilitating, handling and processing consumer transactions, including, but not limited to, sales transactions, fuel purchases, retail purchases, food purchases, lead generation, reward program enrollment, ticket purchases, sweepstakes/lottery ticket purchases, and incentive advertising. More particularly, the present invention relates to an apparatus and system for facilitating, handling and processing consumer transactions through a video display topper and a consumer interface screen affixed to a gas fuel pump, and through a media distribution unit.

SUMMARY OF THE INVENTION

An objective of this invention is to provide a system for managing and processing a consumer transaction, comprising a gas fuel pump, a high-definition video display topper affixed to the gas fuel pump, a consumer interface screen affixed to the gas fuel pump, wherein the interface screen is in electronic communication with the video display topper, prompts the consumer to engage in a consumer transaction or opportunity, and receives input from said consumer when the consumer engages in said transaction or opportunity.

Another object of the invention is to provide a system which includes a fuel media network, the network providing campaign, retailer, advertiser, affiliate, and manager functions and interfaces.

Still another objective of the invention is to provide a system which includes a media display unit with a storage device for media, a transmitter, a cooling system, and a back-up battery; wherein the media display unit is adapted to provide media distribution and content deliver to one or more high-definition video display toppers affixed to one or more gas fuel pumps.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements.

FIG. 7 shows examples of topper unit, interactive interface, and mobile interface displays for a product advertisement.

FIG. 8 shows examples of topper unit, interactive interface, and mobile interface displays for an in-store purchase.

FIG. 9 shows examples of topper unit, interactive interface, and mobile interface displays for an incentive advertisement.

FIG. 10 shows examples of topper unit, interactive interface, and mobile interface displays for an event ticket.

FIG. 11 shows examples of topper unit, interactive interface, and mobile interface displays for insurance lead generation.

FIG. 12 shows examples of topper unit, interactive interface, and mobile interface displays for reward program enrollment.

FIG. 13 shows examples of topper unit, interactive interface, and mobile interface displays for sweepstakes enrollment.

FIGS. 28 through 42 shows examples of screen displays from a management system in accordance with an embodiment of the present invention.

DETAILED DESCRIPTION OF PREFERRED EMBODIMENTS

Figure 1:
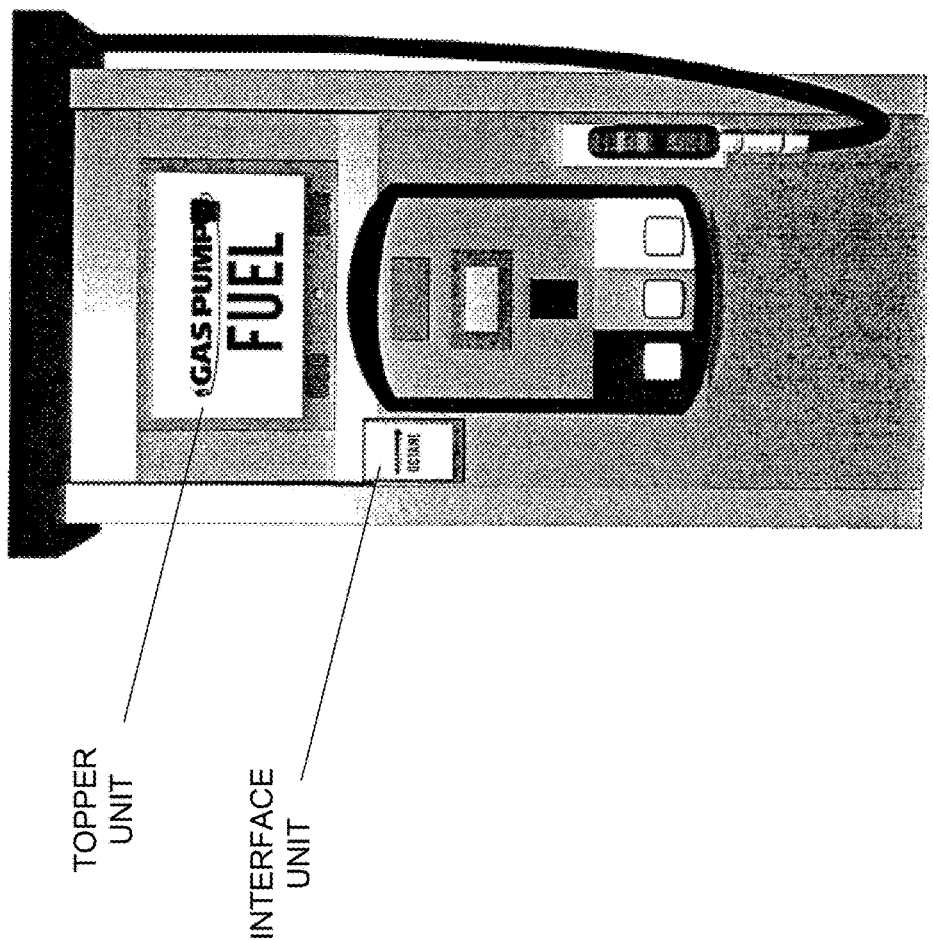
FIG. 1 shows a view of a gas pump with a digital topper unit and digital interactive interface unit in accordance with an embodiment of the present invention.
Figure 2:
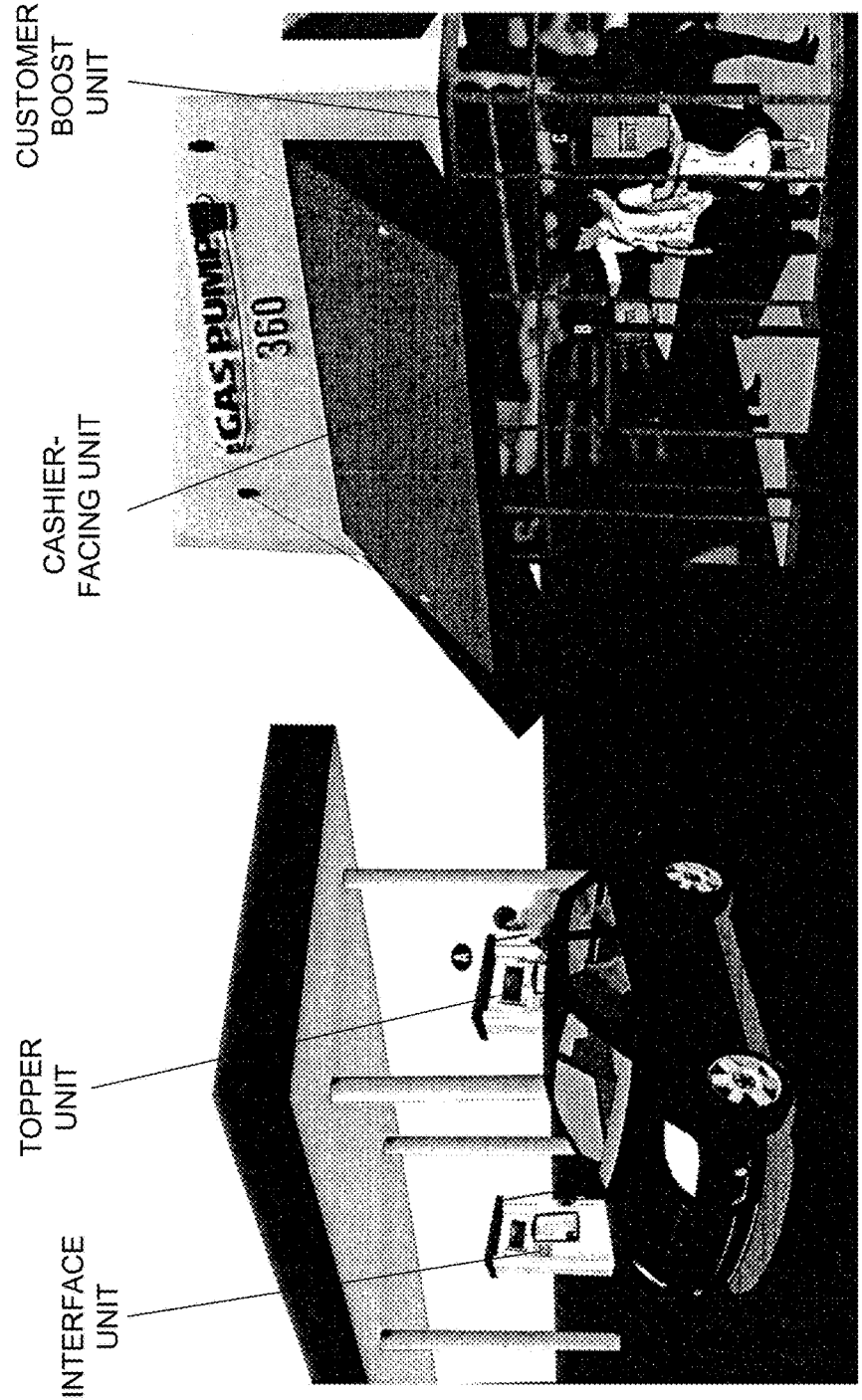
FIG. 2 shows a view of a gas station with the gas pump of FIG. 1 and a Boost unit inside the store.
Figure 3:
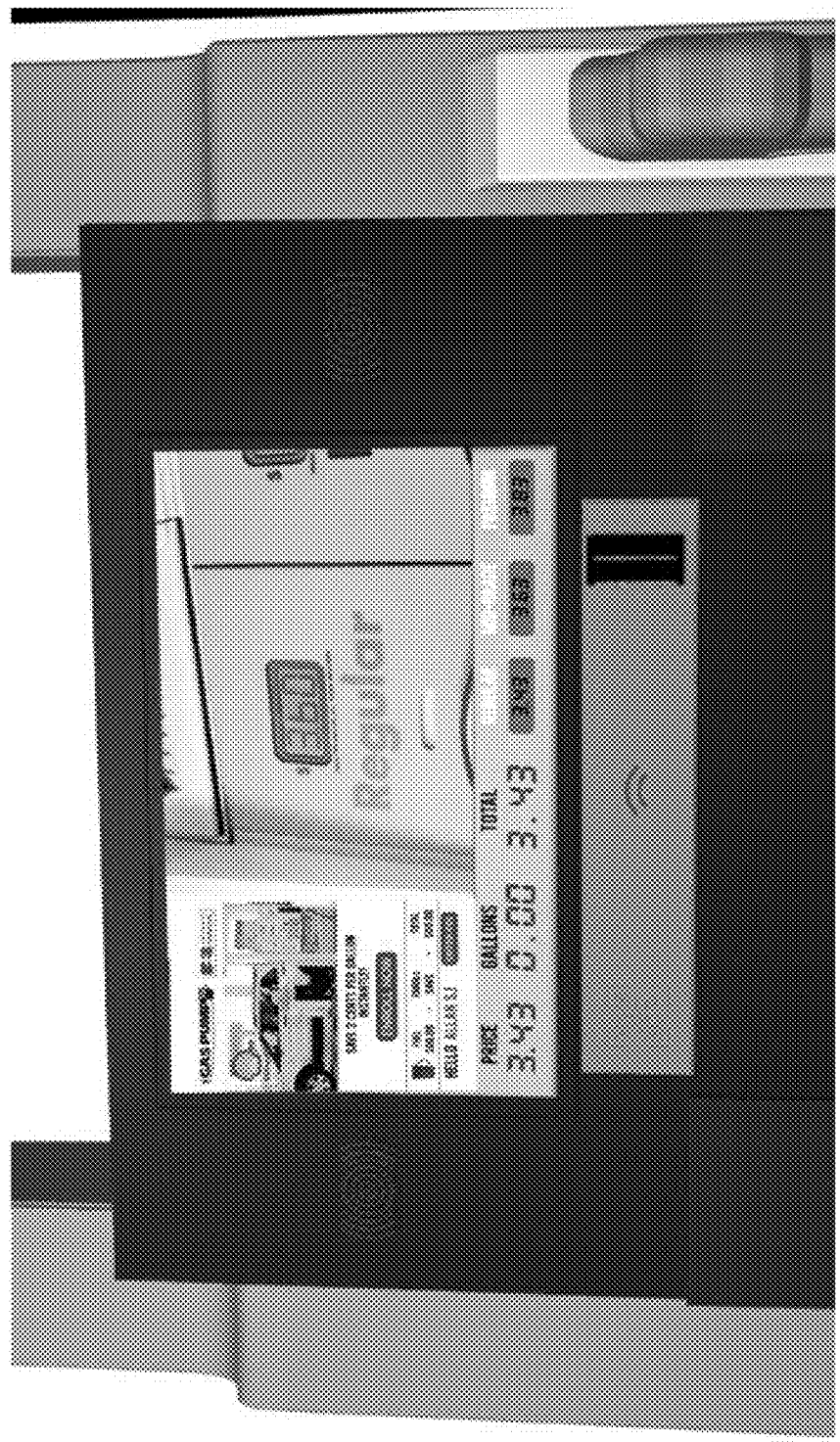
FIG. 3 shows another view of a gas pump with a digital topper unit and digital interactive interface unit.
Figure 4:
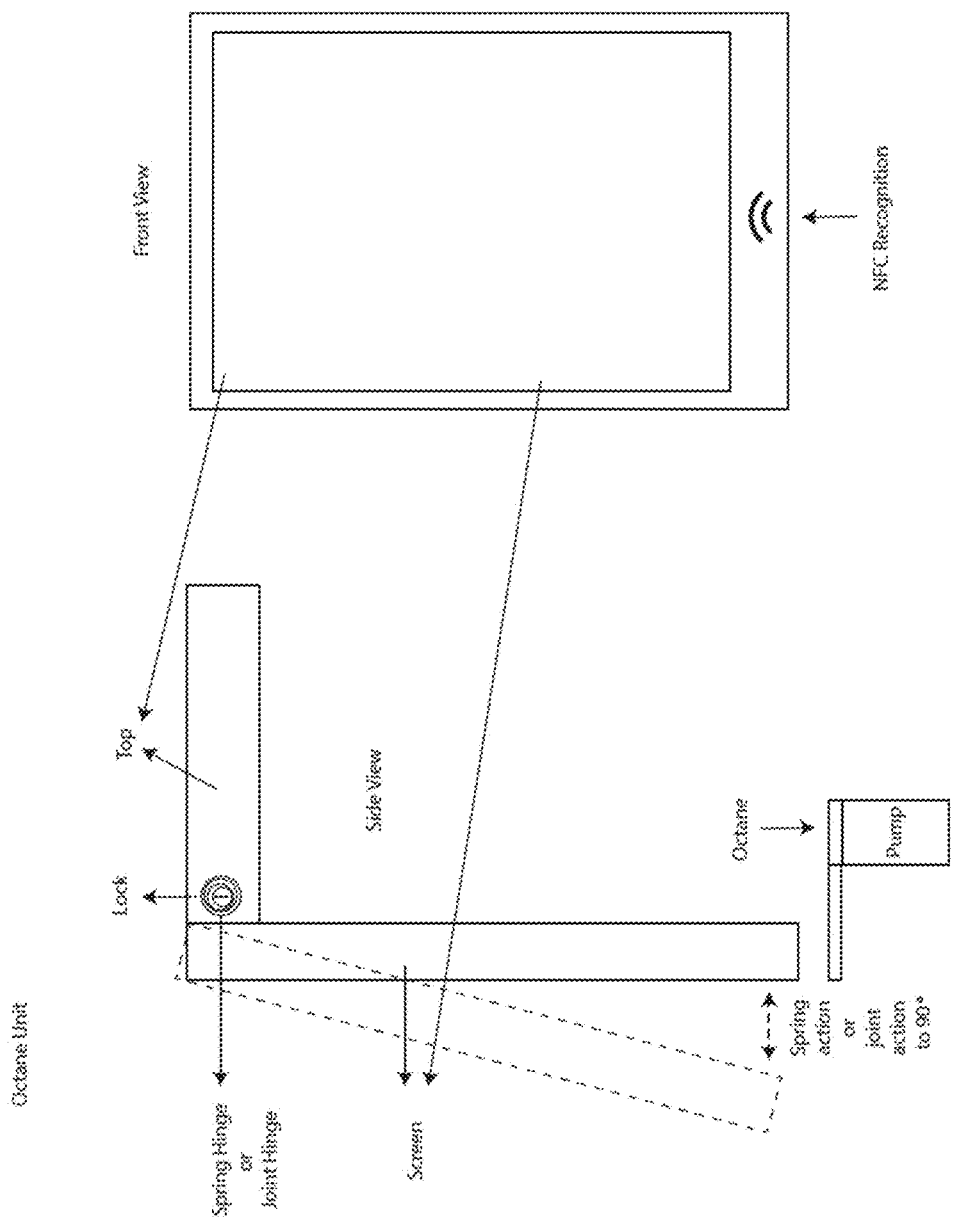
FIG. 4 shows a schematic diagram of a digital interactive interface unit.

Before the subject invention is further described, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

In various exemplary embodiments, the present invention comprises an apparatus and system for facilitating, handling and processing consumer transactions at one or more related points-of-sale (POS). In one particular embodiment, the sales transactions are consumer sales transactions at a gasoline station or similar market or store, with devices at the gas pumps and inside the store that may interact with a fueling consumer's mobile device, if present. However, the present invention may be used in other consumer transaction contexts as well, including, but not limited to, fast food restaurants and retail stores. Consumer transactions include, but are not limited to, sales transactions, fuel purchases, retail purchases, food purchases, lead generation, reward program enrollment, ticket purchases, sweepstakes/lottery ticket purchases, and incentive advertising.

Fuel media network providers have traditionally reached fueling consumers with advertiser content through paper or cardboard gas pump toppers. More recently, digital pump topper have been used. The first digital toppers were self-contained, used DVD or storage devices, were not networked together, and had insufficient weather proofing. Later digital pump toppers have become a vetted technology, with improved weather proofing, networking, and similar improvement. The advertising impression provided to consumers on digital pump toppers has been simple for network providers, advertisers, and consumers alike. First there were digital still ads, then still ads with sound, then ads with full motion video and sound, and finally ads with full motion HD content with sound. However, the HD content comprises a fixed content loop that is the same for all consumers at any given location. The fixed loop averages 5 to 6 minutes (with a cap at 6 minutes), depending on the amount of advertising and the length of content (partnered and captive), such as news, weather, sports, and entertainment. The extent of variability in content was sequential ads (ads that rotate for a given party within their position to show varied content, thus three ads for one party will show once for three continuing fixed loops before starting over again). Moreover, a typical content loop has consisted of point-of-purchase advertising by the retail location (also referred to as the network location); advertiser content (advertising products, services, locations, programs, incentives, sweepstakes, rewards, and the like); partnered content (advertising products, services, locations, programs, incentives, sweepstakes, rewards, and the like); and captive content (comprising news, weather, sports, and entertainment).

As seen in FIGS. 1-6, a system in accordance with an exemplary embodiment of the present invention comprises a high-definition digital pump topper unit and a touch-sensitive digital pump interactive interface unit, which may be in wireless communication with an application program on a consumer's mobile computing device (e.g., smart phone, tablet computer, or the like). The digital pump topper and pump interface may be removably attached to the pump, integrated therewith, or combinations thereof. The digital pump topper, pump interface, or both, may be equipped for near-field communications or low-energy bluetooth communications receivers or other components ("NFC-BLE"), enabling communication with a similarly-equipped mobile computing device. One or more digital cameras also may be located at the pump, to provide facial recognition capabilities.

The digital pump topper and pump interface are connected, wired or wirelessly, to a fuel media network. The network may further comprise a combination display inside the store, with a customer-facing, interactive touch display in electronic communication with a cashier-facing display. The customer unit may be referred to as a "Boost" unit for "boosting" retail sales. One or both displays may also be NFC-BLE capable.

Figure 5:
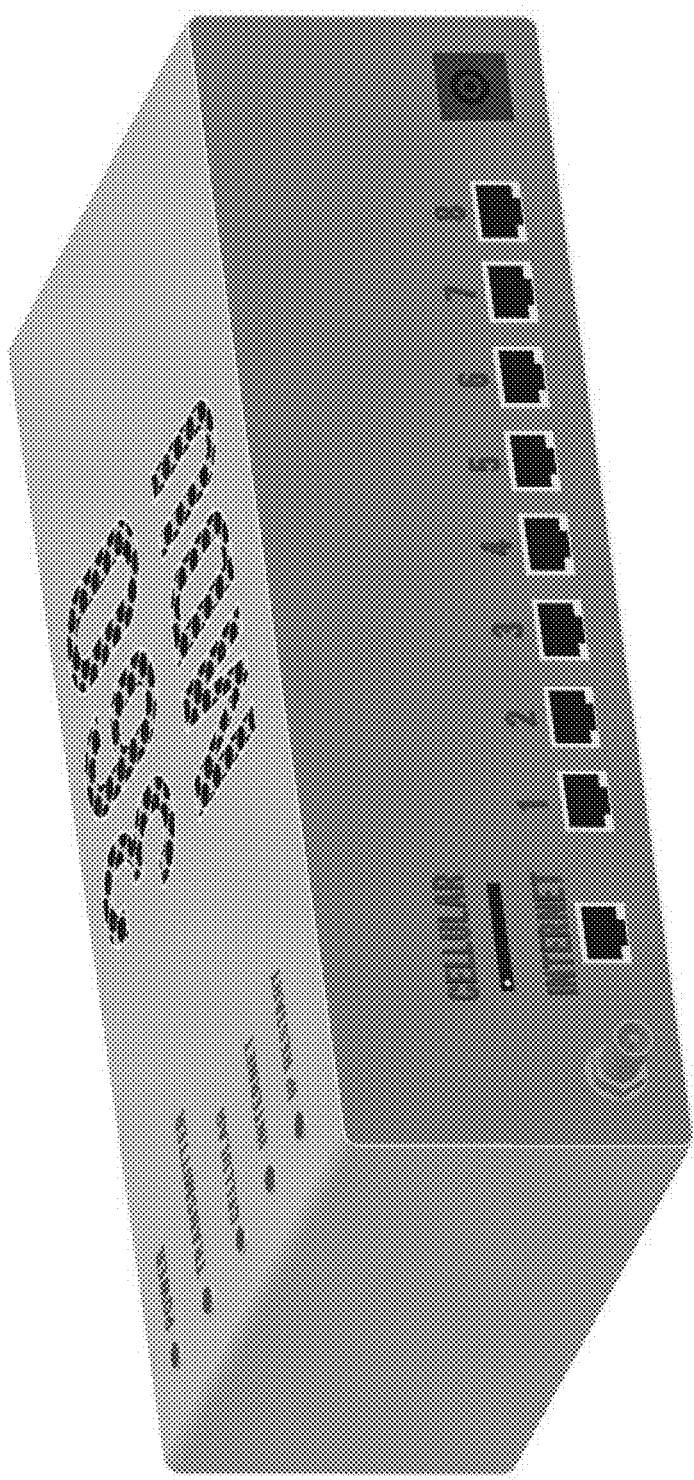
FIG. 5 shows an exterior view of a media distribution unit (MDU).
Figure 6:
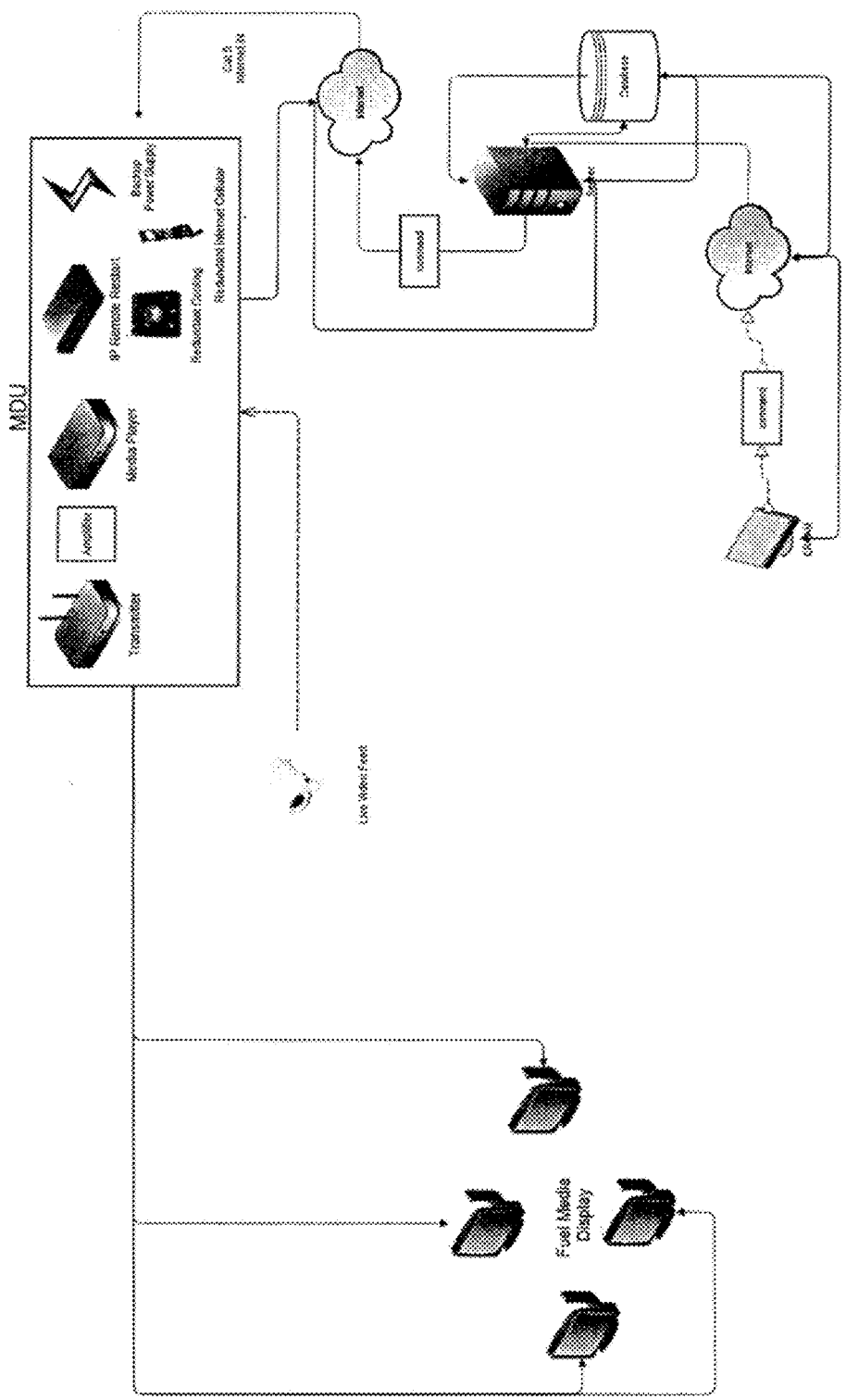
FIG. 6 shows a network comprising multiple gas pumps with displays and a media distribution unit.

The network may further comprise a media distribution unit (MDU) in or near the store, as seen in FIG. 5-6. In several embodiments, the MDU is a single, all-encompassing unit that has media player functionality and a transmitter, and includes a number of redundancies for elite media distribution, content delivery, and management. While running on the electrical system in the building, the MDU also has a back-up battery. During short power outages (i.e., 1-20 minutes), this allows for continuous operation without interruption. During extended power outages (i.e., more than 20 minutes), this allows for a graceful shutdown of hardware and software devices. The MDU also comprises a remote-IP restart device. After a power outage, when the backup reserve power has been drained and when power comes back online, if the player does not restart on its own, the IP restart provides for remote restarting.

The MDU is connected to the Internet or other network wired or wirelessly (e.g., through a hardwired cat-5 port or via an in-store pre-existing router). The MDU also has a redundant internet connection via a wireless internet card. During times of internet outages or extremely slow data transfer via a pre-existing in-store router, the wireless internet card connection is enabled, thereby maintaining Internet connectivity and data transfer.

The MDU comprises redundant cooling/heating that provides for higher ranges of temperature operation. This is a significant advantage, as the unit often is placed in suspended ceilings or attic spaces, which can cause overheating issues. It further comprises a built-in amplifier to boost signal strength in large deployments, and has diagnostic capabilities to monitor, detect, manage and manage device functionality.

The fuel media network is managed through a campaign-retailer-advertiser-affiliate-manager (CRAAM) system. To manage a fuel media network, there must be coordination and visibility amongst all associated parties. Previously, network managers, affiliates, advertisers, retailers, partners, and other associated parties were all disconnected and required coordination through manual methods. Moreover, network managers need to be able to control content and technical components of various hardware, peripherals, mobile devices and software. To deliver dynamic media and provide multi-way customer interaction at a gas dispenser, in-store, or mobile on-the-go, a network operator must use a number of software systems that are disconnected and insufficient for total control, maximum uptime, total offsite troubleshooting, party integration, demographic collection. Moreover, with available non-encompassing systems or through manual methods, redundant data entry occurs when entering information from one system to another, or with one method to another. This occurs at each network location, with advertisers, affiliates, retailers, network managers, partners, lower level users, and other groups.

CRAAM comprises an all-inclusive platform that joins all parties related to business processes, such as, but not limited to, sales, media distribution, network management, affiliates, retailers, partners, and customer groups. It provides the control of hardware and other software through a centralized software system. It provides data management, scheduling, programming, interface design, algorithm-based decision making, transfer of customer data packets, analytics and statistics to advertisers and all parties who have consumer based interactions, and any necessary functions needed to carry out this process in any deployment.

CRAAM provides an interface for each party or group involved to control, manage or view any relevant data, or any hardware or software. Overlapping or party-exchanged data is shared with appropriate users or user groups. All users are able to view behavioral, demographic statistics and other data resulting from each advertisement via integrated recognition software and hardware. Exemplary displays are shown in FIGS. 28-42.

The present system thus allows for complete management of each party's relevant data, controls, processes, statistics and performance. Integrated, comprehensive diagnostics of hardware performance can be monitored. It coordinates affiliate sales amongst various advertisers, including creating proposals and communicating with advertisers, retailers and affiliates across multiple networks, platforms and geographies. Affiliate locations, space availability and advertising conflicts are required to analyze the ability to define a campaign's geographic reach, and with the present system, gathering such information and data is instantaneous and actionable. For example, for a campaign manager, CRAAM provides impressions, loops, ad frequency, geographic and demographic information to more effectively validate market reach and advertiser cost, and thus determine return on investment.

Network managers have total oversight on each location's performance data, statistics, diagnostics, live video feed of site displays, remote access, remote troubleshooting, redundancy controls, content creation, content management, content programming, or scheduling/management of any peripheral connected to the system, as well as all related data. Network managers can manage all user groups and relevant data real-time with instantaneous execution.

The system thus allows fueling consumers to act through their mobile device and/or digital pump interfaces in response to any media or content displayed on the digital pump topper. Any programmed action can be carried out, including, but not limited to, the following: buying products; buying services; enrolling in subscriptions; getting directions to locations; program enrollment; capturing incentives; lottery/sweepstake enrollment and/or participation; reward enrollment and/or utilization; purchasing tickets to movies or events; auto-application downloads; and the like.

The system provides customer recognition upon arrival at a system-equipped location, using NFC-BLE communications, geo-location/GPS, facial recognition technology, or combinations thereof. The customer may view content on the digital pump topper and take action through the digital pump interface, although full-range integrated experiences are provides if the consumer has a mobile computing device equipped with an application for the system, and/or a mobile wallet. Customers thus may be greeted upon arrival, asked to enter a PIN or validate themselves through their mobile device, and validated for fuel payment, all while shown ads and actionable opportunities based on the specific individual's preferences or profile.

Examples of actionable opportunities include, but are not limited to, the following:

1. If the consumer is shown an auto-insurance commercial on the topper unit, during that advertisement the consumer will be shown an ad through the interface unit asking them if they want to save money now. If they select to save money now, their stored information (i.e., stored by the mobile application) will be sent to a local automobile insurance agent from the advertising entity closest to them to be contacted. If the system is integrated with the auto-insurance advertiser's quoting system, it can offer a specific price quote and savings based on the individual consumer information, and provide them the ability to purchase insurance instantly. This interaction can occur with any type of insurance.

2. If the consumer is shown a retailer in-store product commercial on the topper unit, during that advertisement the consumer will be shown an ad through the interface unit to purchase the in-store product now. If they elect to purchase (i.e., by interacting with the digital pump interface or through their mobile device), the product will be added to their fuel purchase, and will ready for pick-up in-store.

3. If the consumer is shown an advertiser product commercial on the topper unit, during that advertisement the consumer will be shown an ad through the interface unit to purchase the product. If they elect to purchase (in a manner as described above), the product will be shipped to the shipping address stored in their mobile wallet. If they have multiple shipping addresses, the consumer will be able to select a separate address in a quick drop-down menu. If the product is offered through Amazon or other retailer with drone-deliver services, the product may reach their house and find their product waiting for them on their porch or doorstep.

4. If the consumer is shown a rewards commercial on the topper unit, during that advertisement the consumer will be shown an ad through the interface unit for enrolling. If they elect to enroll, the consumer will be enrolled and the rewards program be connected within their system mobile app. If the rewards program provides an incentive (such as "cents off their current fuel purchase upon enrollment"), their gas will be discounted.

5. If the consumer is shown a commercial on the topper unit featuring an event or concert, during that ad length the consumer will be shown an ad through the interface unit to purchase tickets. If they elect to purchase tickets, the consumer will be sold the tickets and an electronic ticket be stored in their system mobile app, and also in the application or program of the selling first-party entity. If the event or concert has multiple date/venue options, the consumer will be able to select a date or venue option from a quick drop-down list.

6. If the consumer is shown a commercial on the topper unit featuring a movie preview or trailer, during that ad length the consumer will be shown an ad through the interface unit to purchase tickets for the movie. If they elect to purchase tickets, the consumer will be able to select the location, date, show time, and number of tickets, be sold the ticket, and an electronic ticket be stored in their system mobile app, and also in the application or program of the selling entity.

7. If the consumer is shown a commercial on the topper unit featuring an incentive (such as $10,000 off a specific vehicle), during that advertisement the consumer will be shown an ad through the interface unit to accept the incentive. If they elect to select the incentive, the incentive will be stored in their system mobile app and their information sent to the selling entity.

Consumers do not need to have the system mobile app installed to be able to participate in actionable opportunities. Consumers can interact direct with the interface unit or through their general communications app on their mobile device, and be able to enter their mobile number (or email) and receive texts to assist in engagement/conversion/action. Consumers will be sent texts to carry through with their actions as well as an app download link to improve their user experience.

Exemplary screens and images for the above examples, and others (e.g., sweepstakes/lottery enrollment or purchase), are shown in FIGS. 7-13. In the figures, "Fuel" refers to the fuel pump topper unit, while "Octane" refers to the fuel pump interface unit.

In several embodiments, a mobile wallet may be used. The mobile wallet uses a general payment card, or the payment card associated with that category of purchase. Mobile device and/or wallet users not a part of the system can pay through the standard card reader with their normal sequence fuel purchase. When the fuel purchase is complete, users can continue with the system experience on their mobile device or the interface unit.

Facial recognition may be used as an additional tool to, among other things, detect age, gender, nationality, and other characteristics to provide for a better user experience and to better target consumers in showing more specified content. Targeting, behavioral, trend, and/or specified marketing is not be limited to purchase history. The system also may use third-party data to better target customers and offer them more specified and relevant content. Options may be based on, but are not limited to, date, geo-location, and home location.

Figure 14:
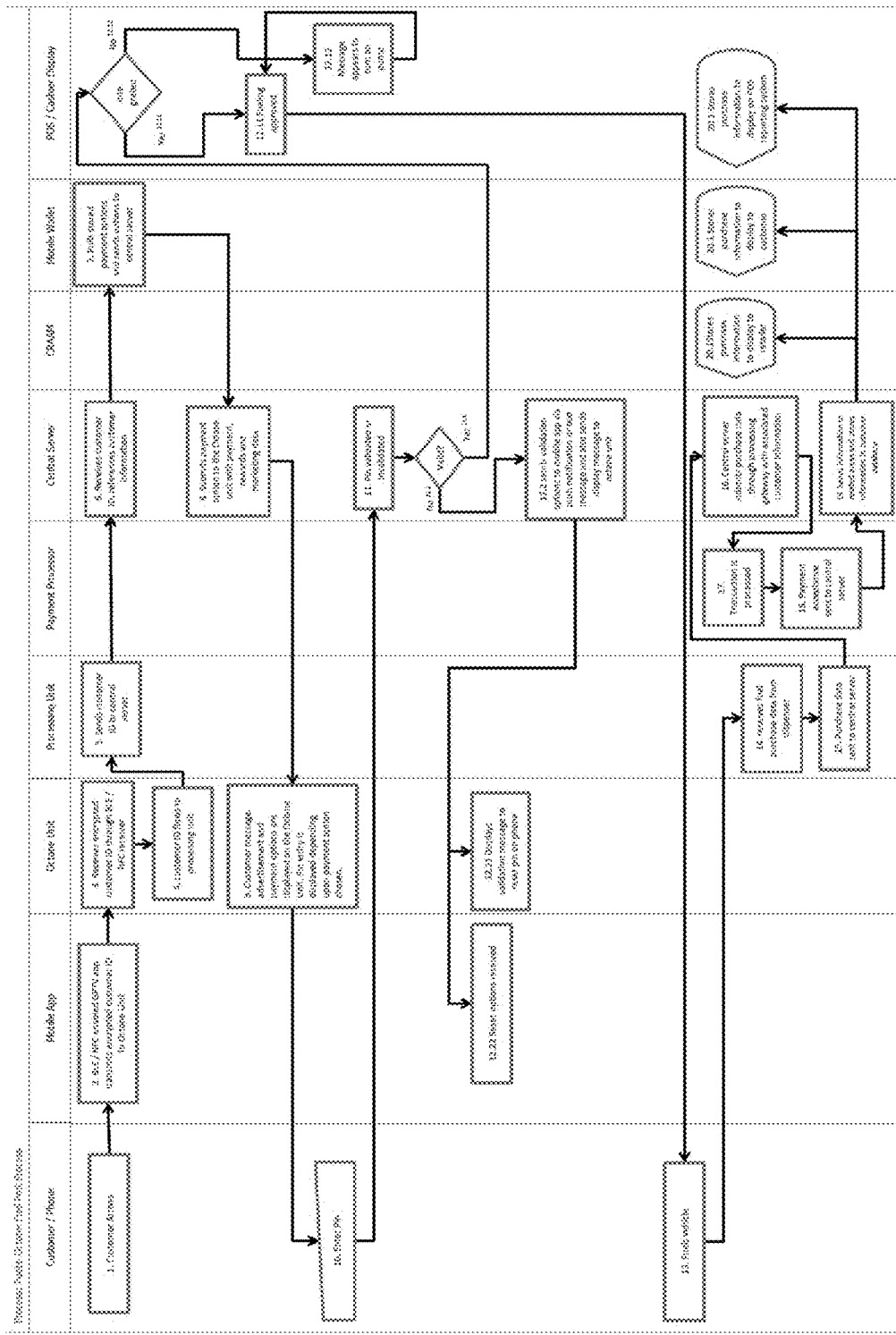
FIG. 14 shows an exemplary process flow for fuel purchases.
Figure 15:
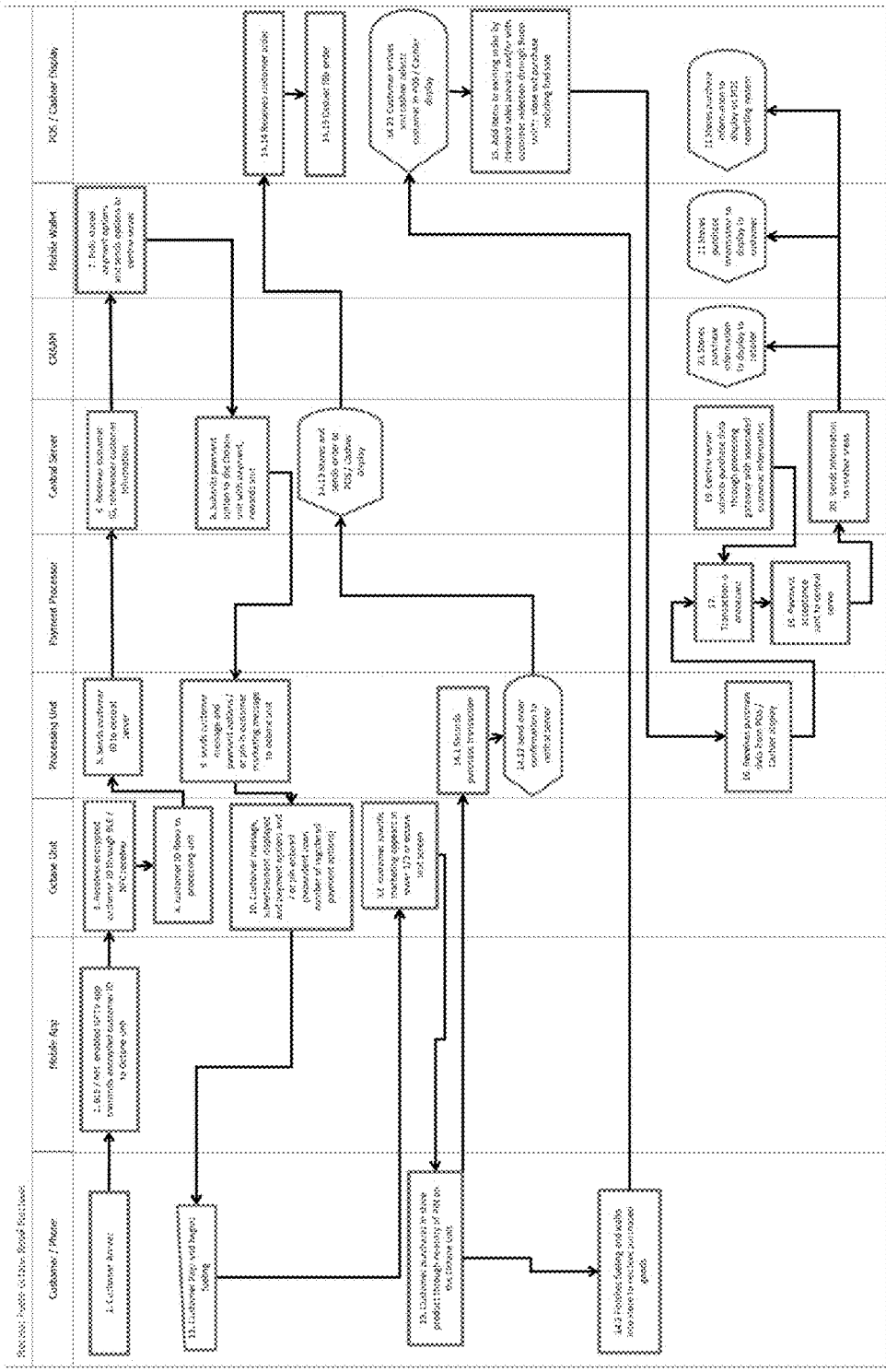
FIG. 15 shows an exemplary process flow for retail purchases.
Figure 16:
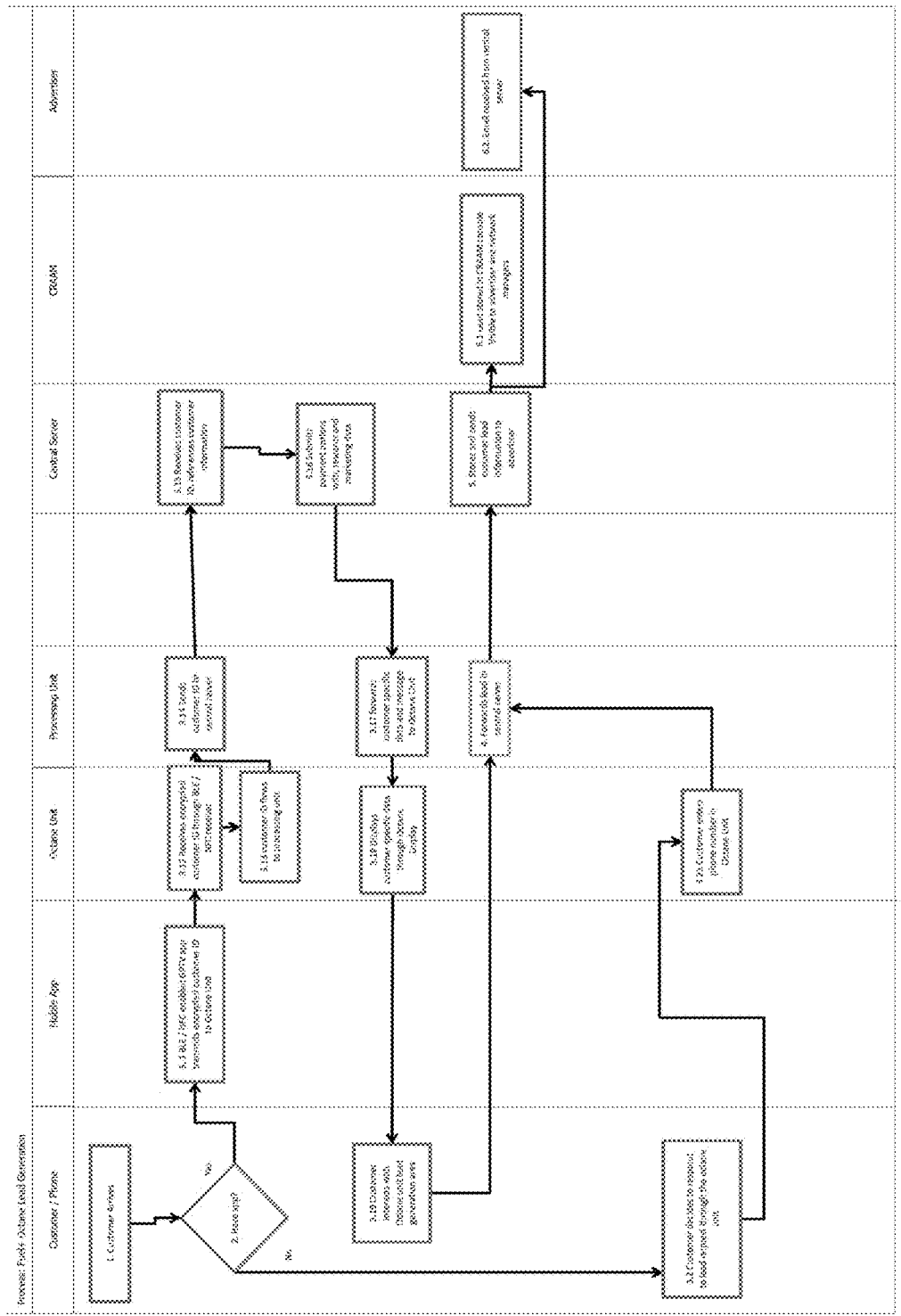
FIG. 16 shows an exemplary process flow for lead generation.
Figure 17:
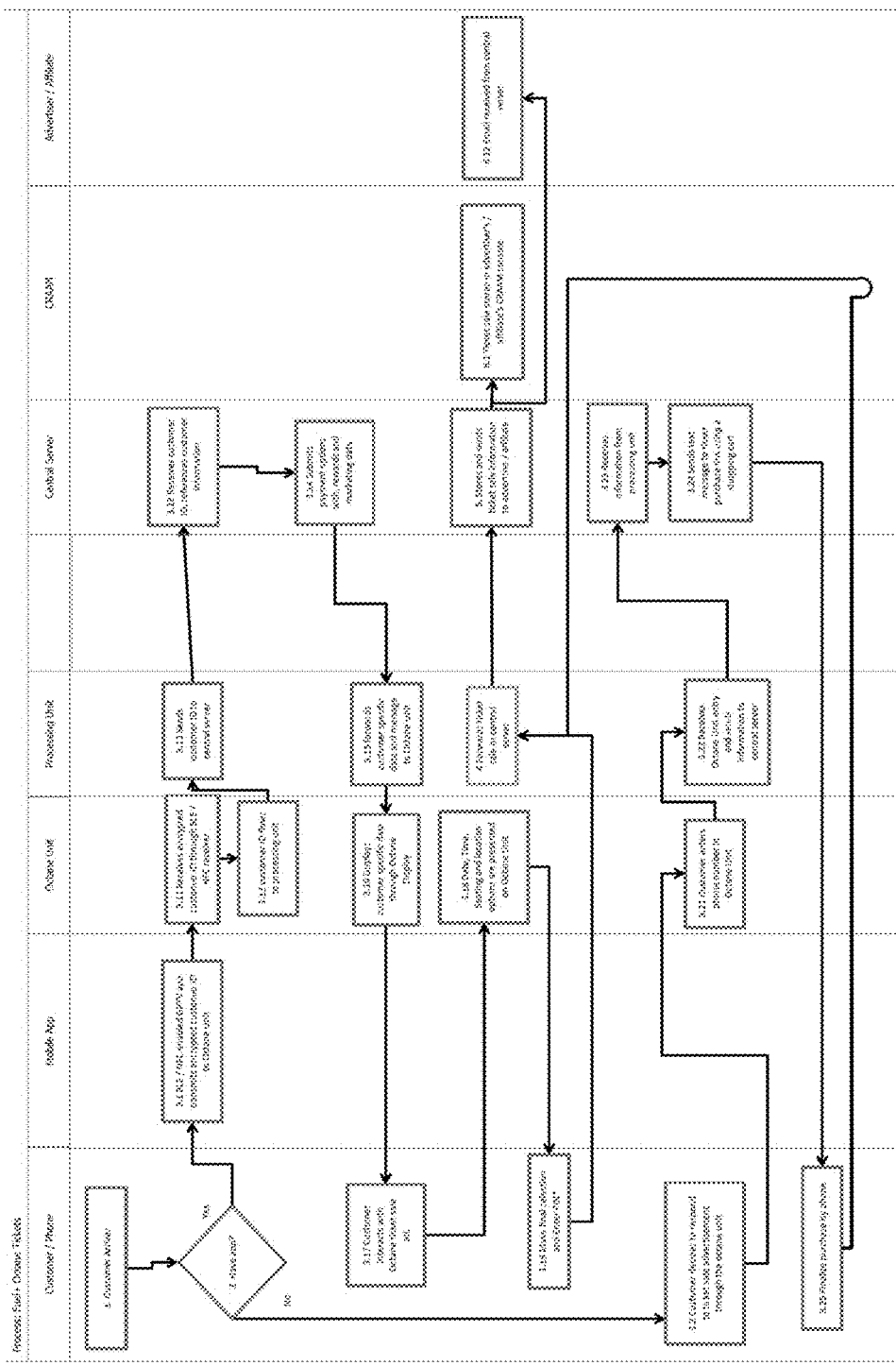
FIG. 17 shows an exemplary process flow for ticket purchases.
Figure 18:
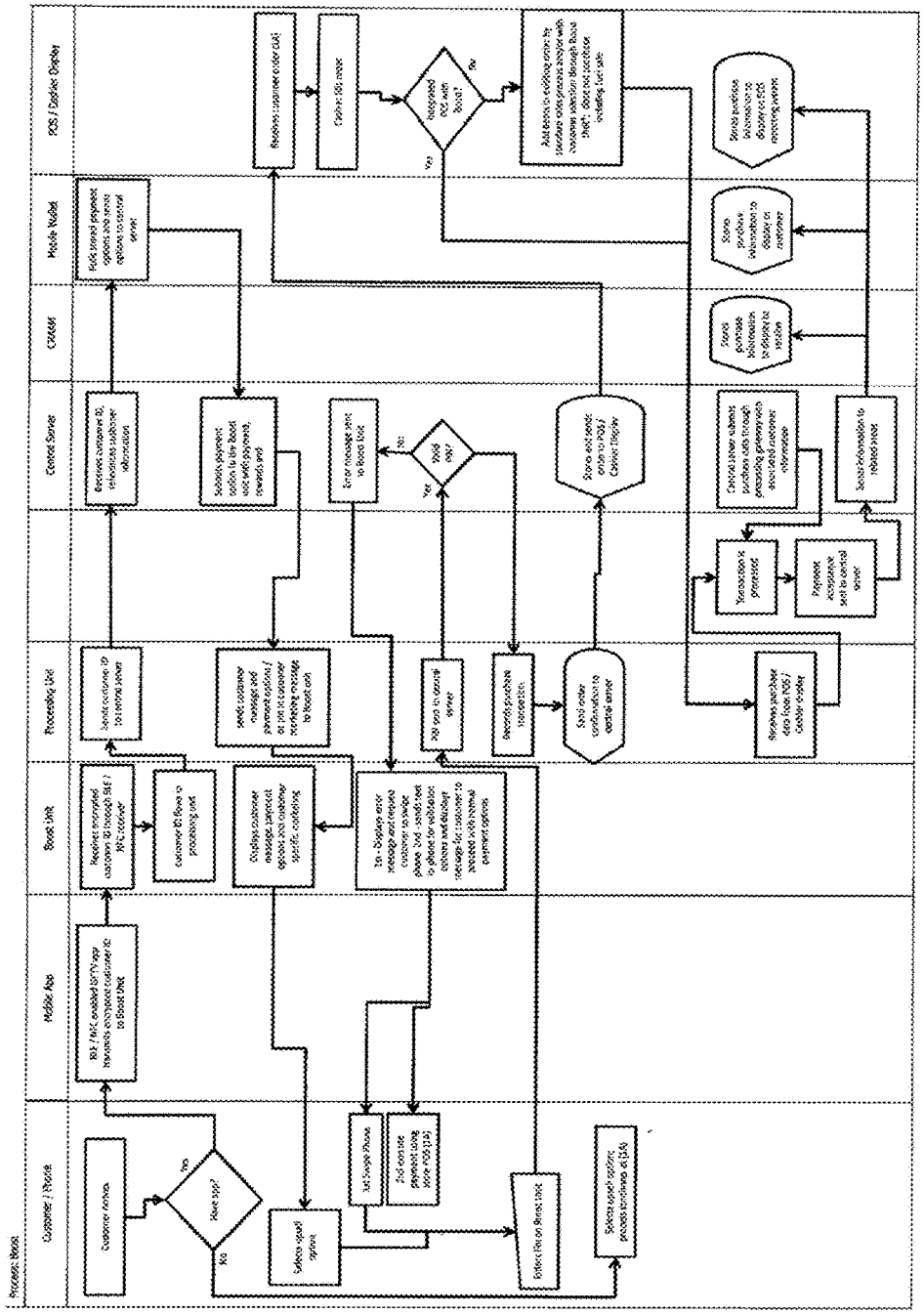
FIG. 18 shows an exemplary process flow for in-store purchases.
Figure 19:
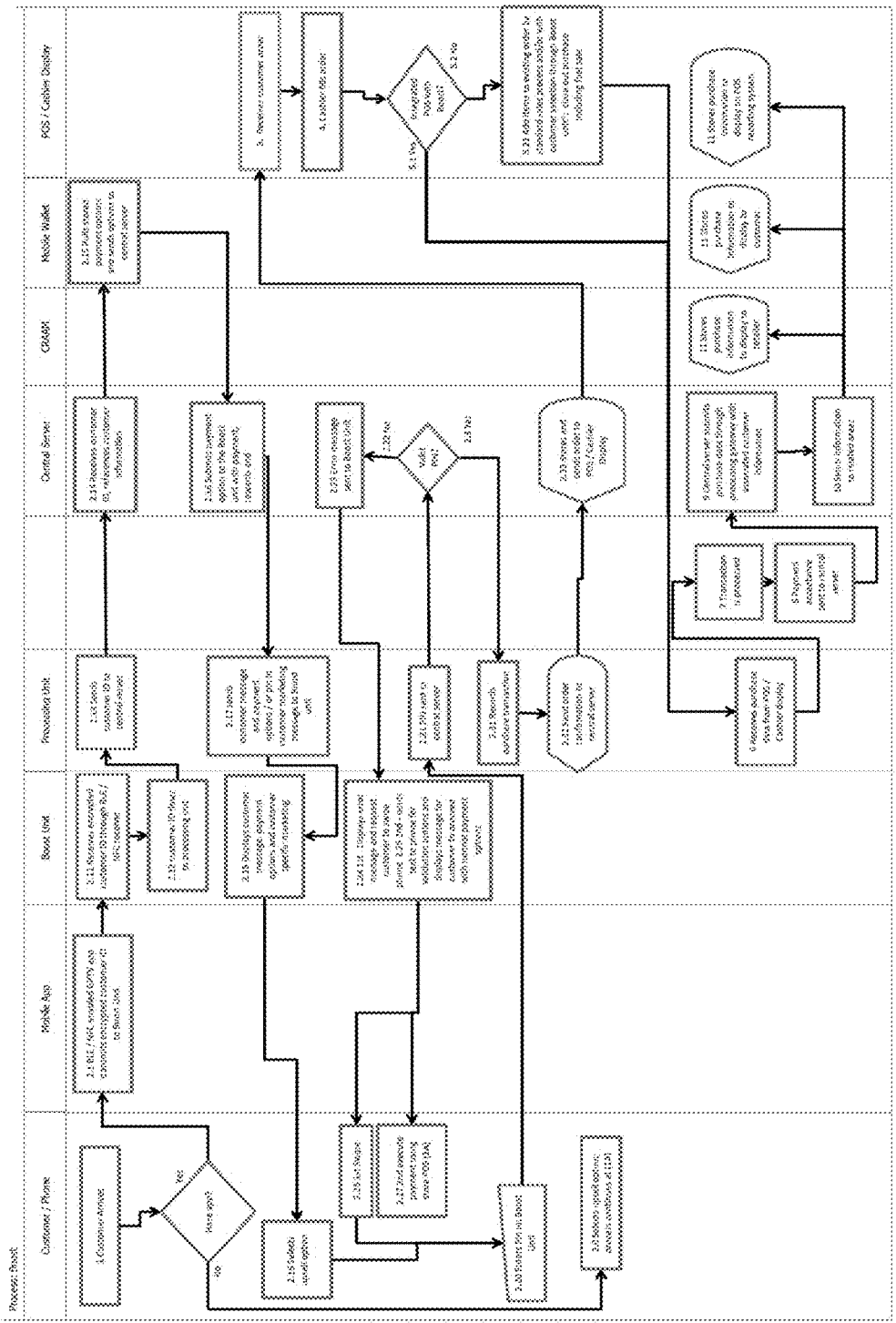
FIG. 19 shows another exemplary process for in-store purchases.

FIGS. 14-19 shows several examples of process flows for the present invention. FIG. 14 shows a process for fuel purchasing. FIG. 15 shows a process for retail purchases. FIG. 16 shows a process for lead generation. FIG. 17 shows a process for purchasing a ticket. FIGS. 18-19 show processes for an in-store purchase.

Figure 20:
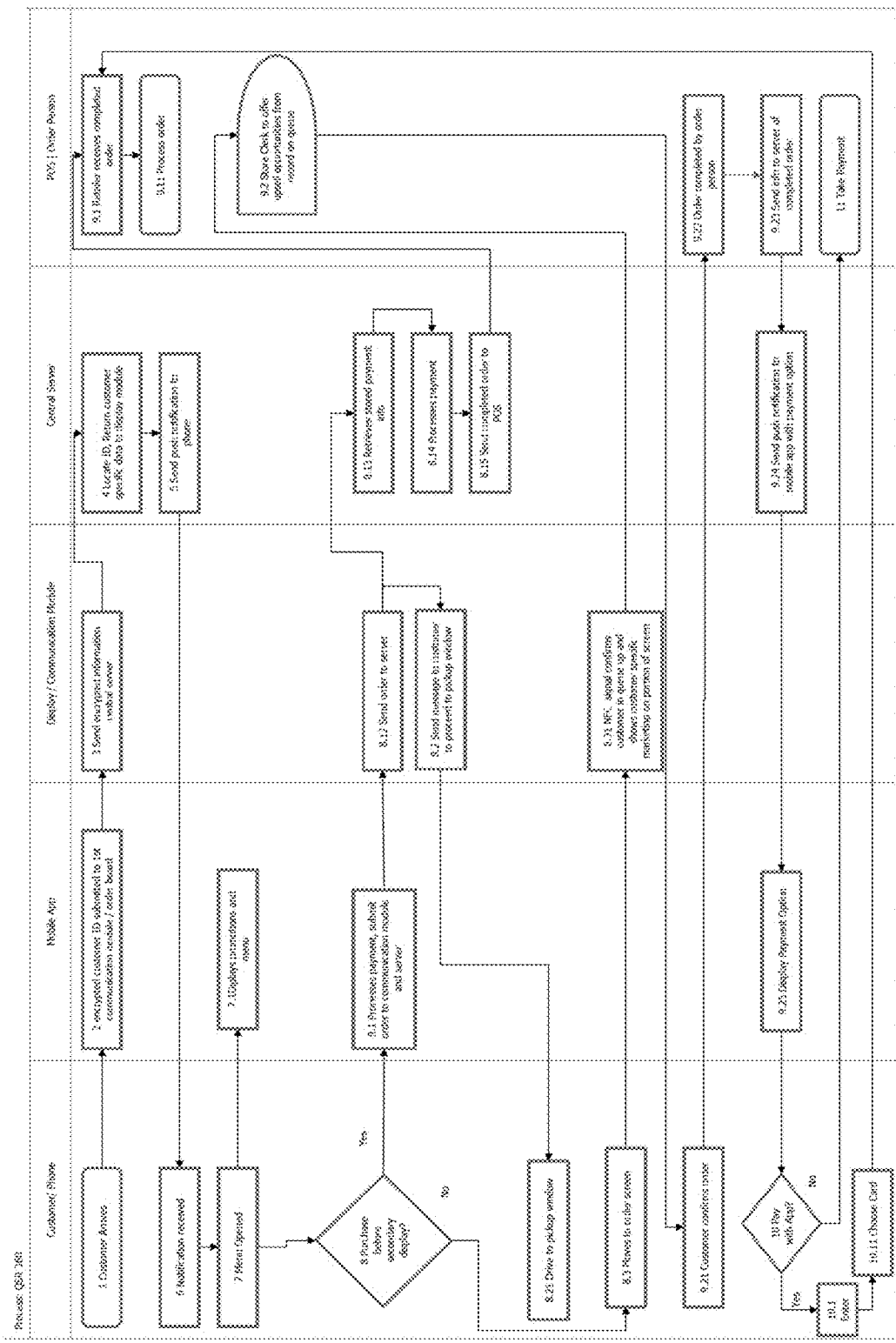
FIG. 20 shows an exemplary process for fast-food purchases.
Figure 21:
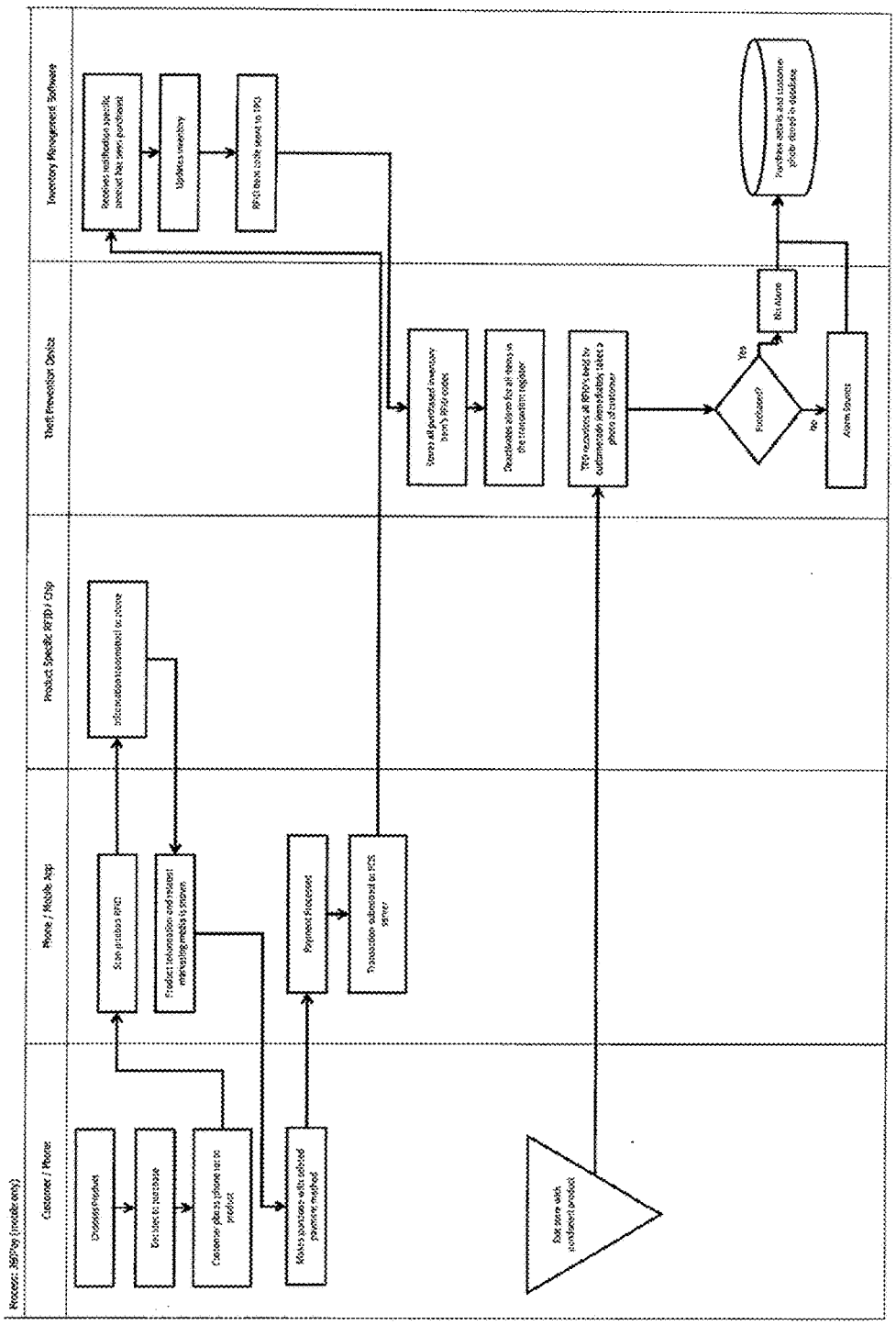
FIG. 21 shows an exemplary process for item purchases in a store using a mobile device.
Figure 22:
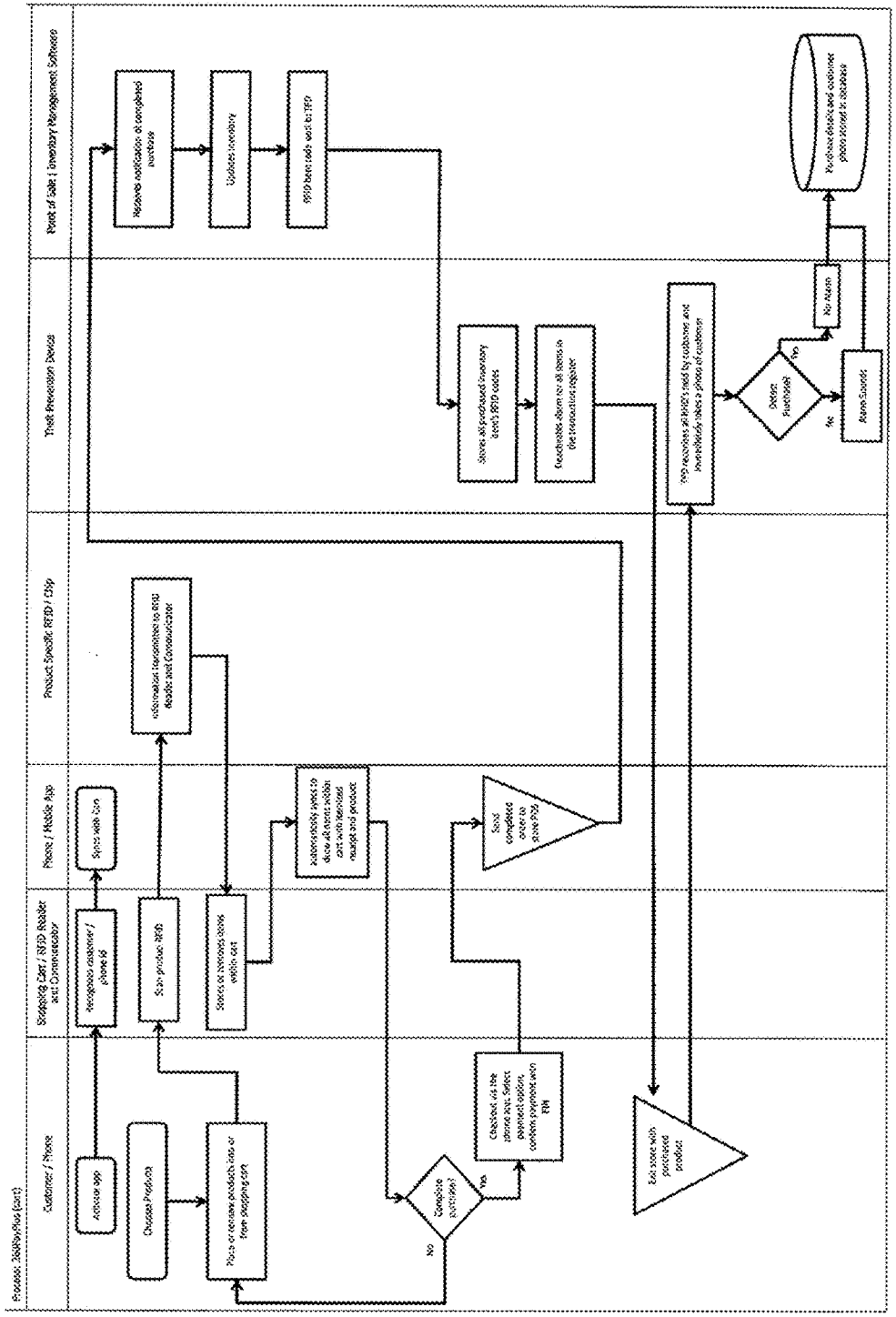
FIGS. 22 and 23 show exemplary processes for item purchases within a shopping cart using a mobile device.
Figure 23:
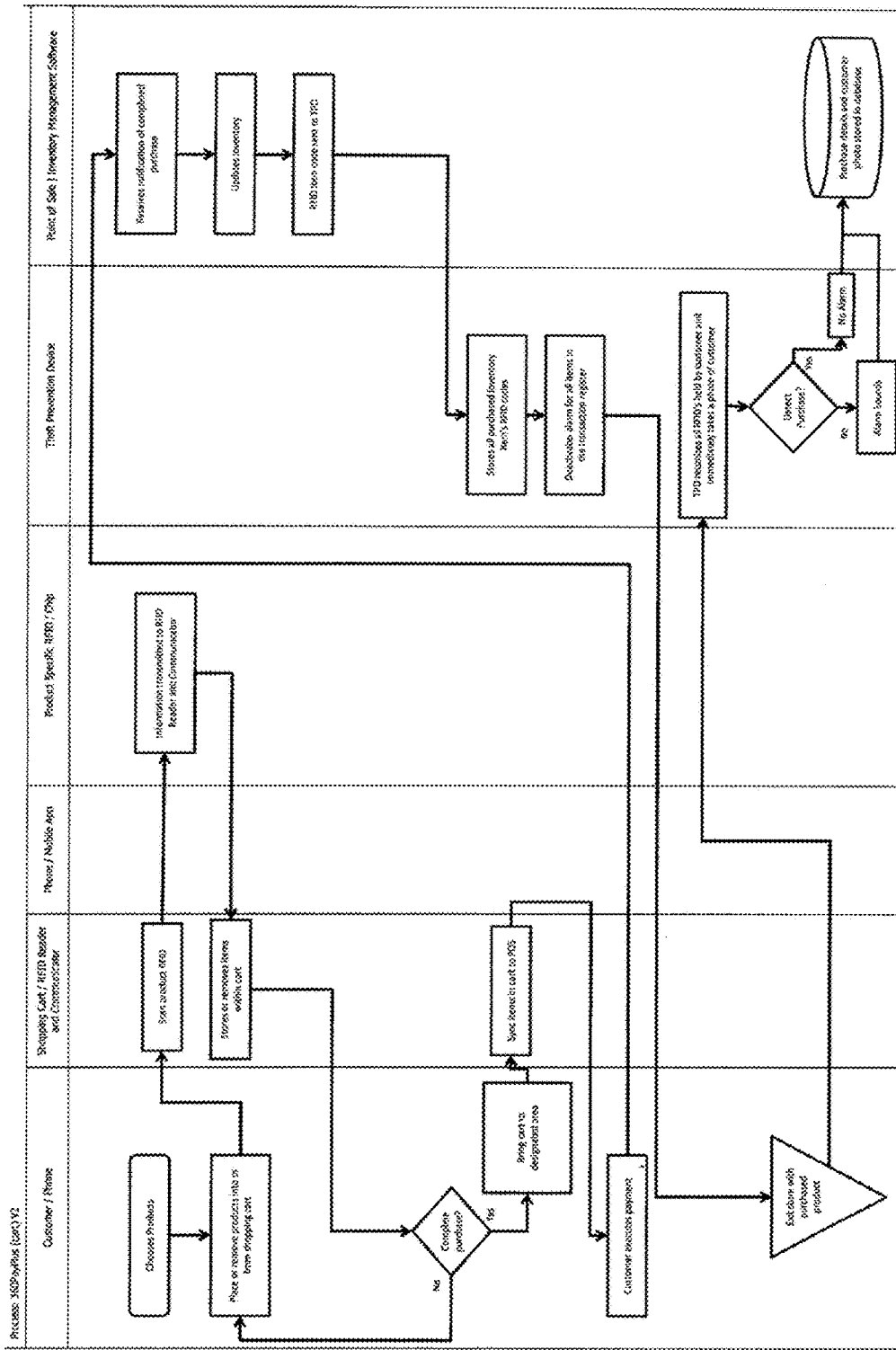
Figure 24:
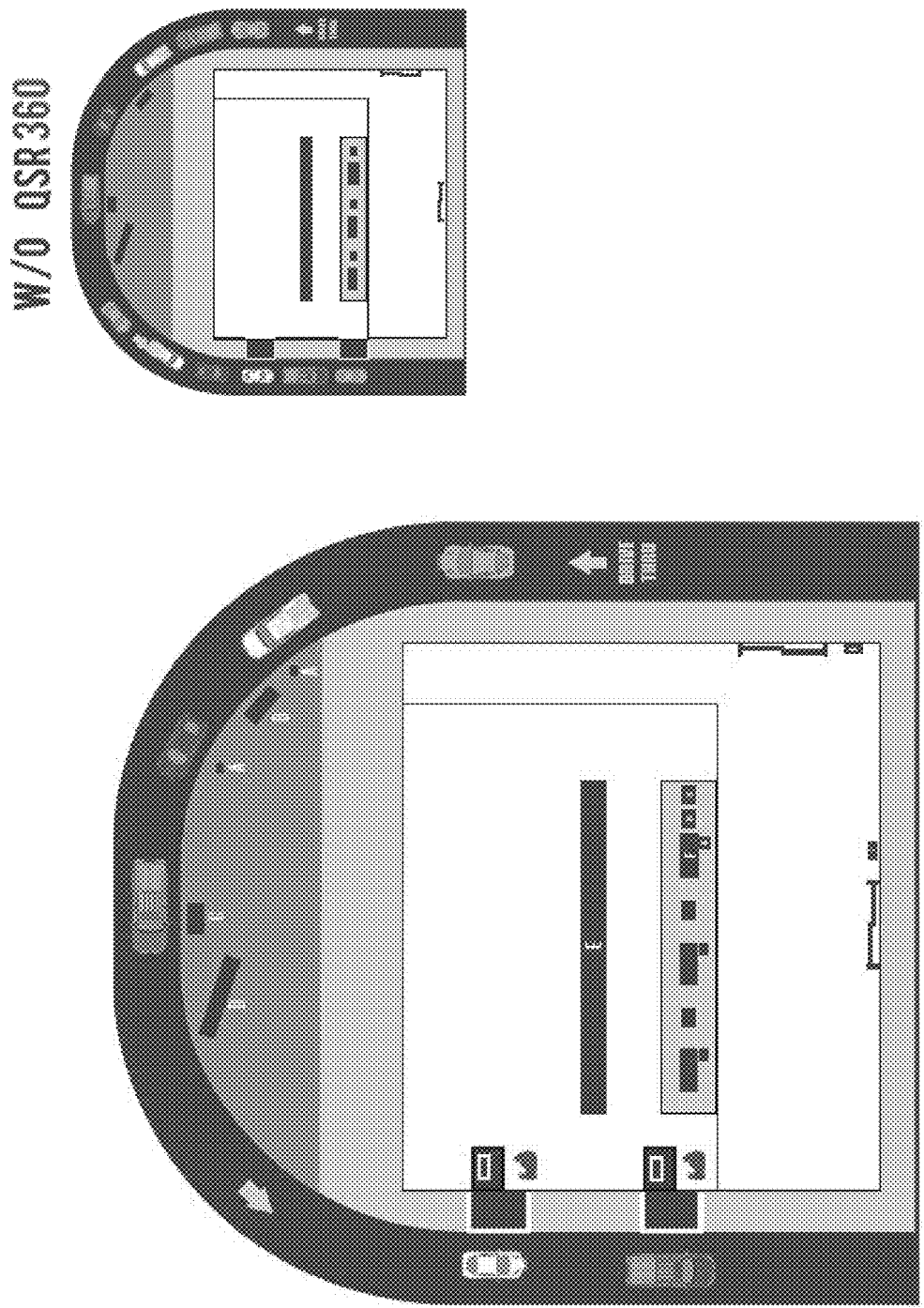
FIG. 24 an overhead view of traffic flow for a fast-food restaurant using an embodiment of the present invention.
Figure 25:
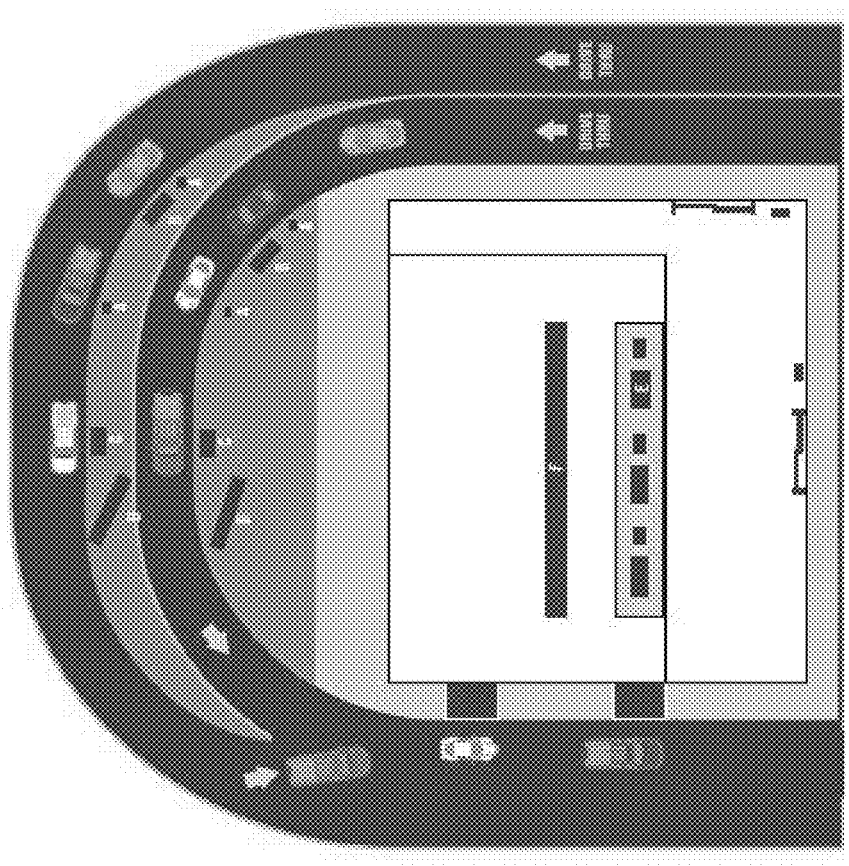
FIG. 25 shows an overhead view of a traffic flow for the restaurant of FIG. 24 with two drive-through lanes.
Figure 26:
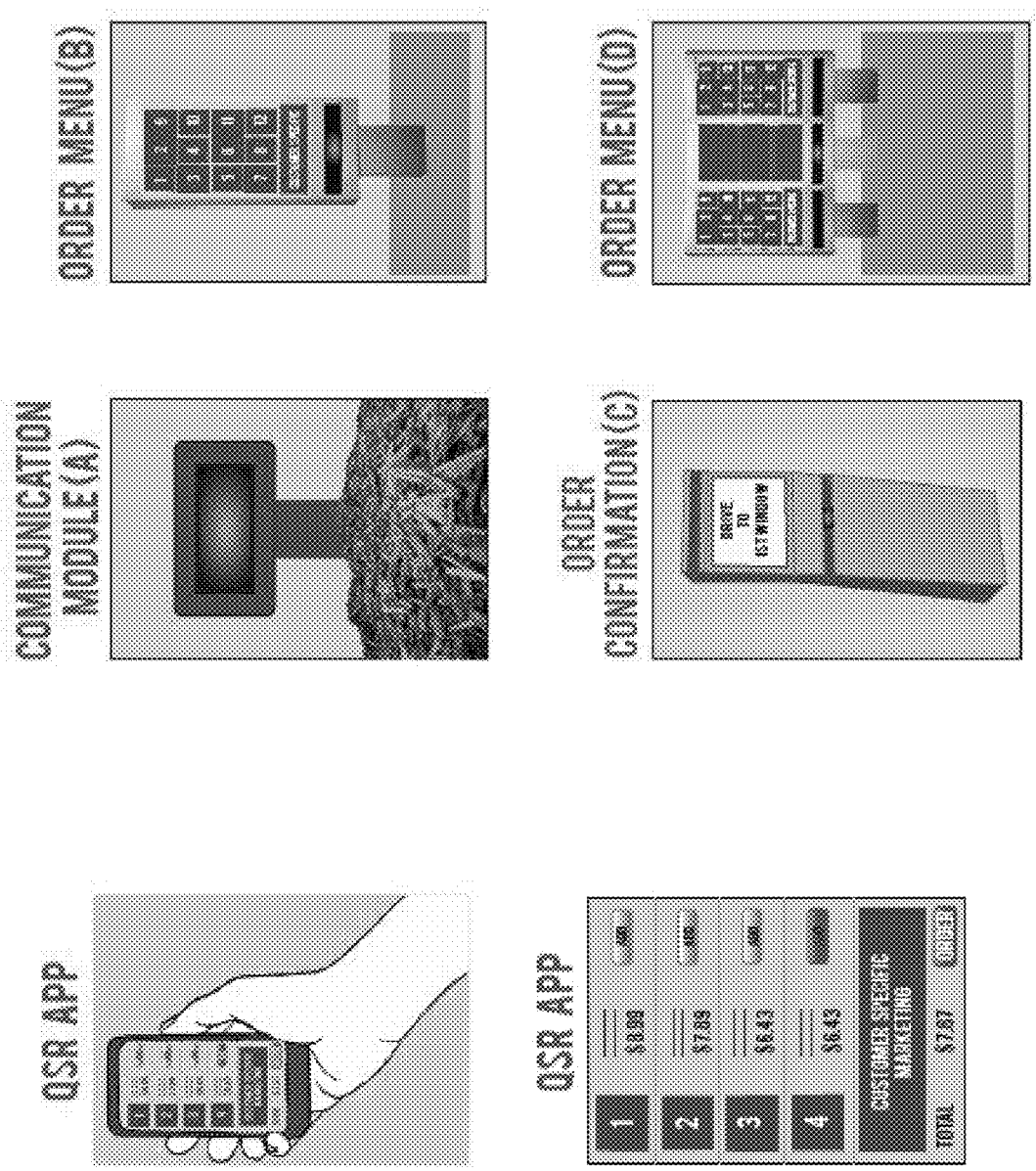
FIGS. 26 and 27 shows examples of screens and components of the system used for the restaurant of FIGS. 24 and 25.
Figure 27:
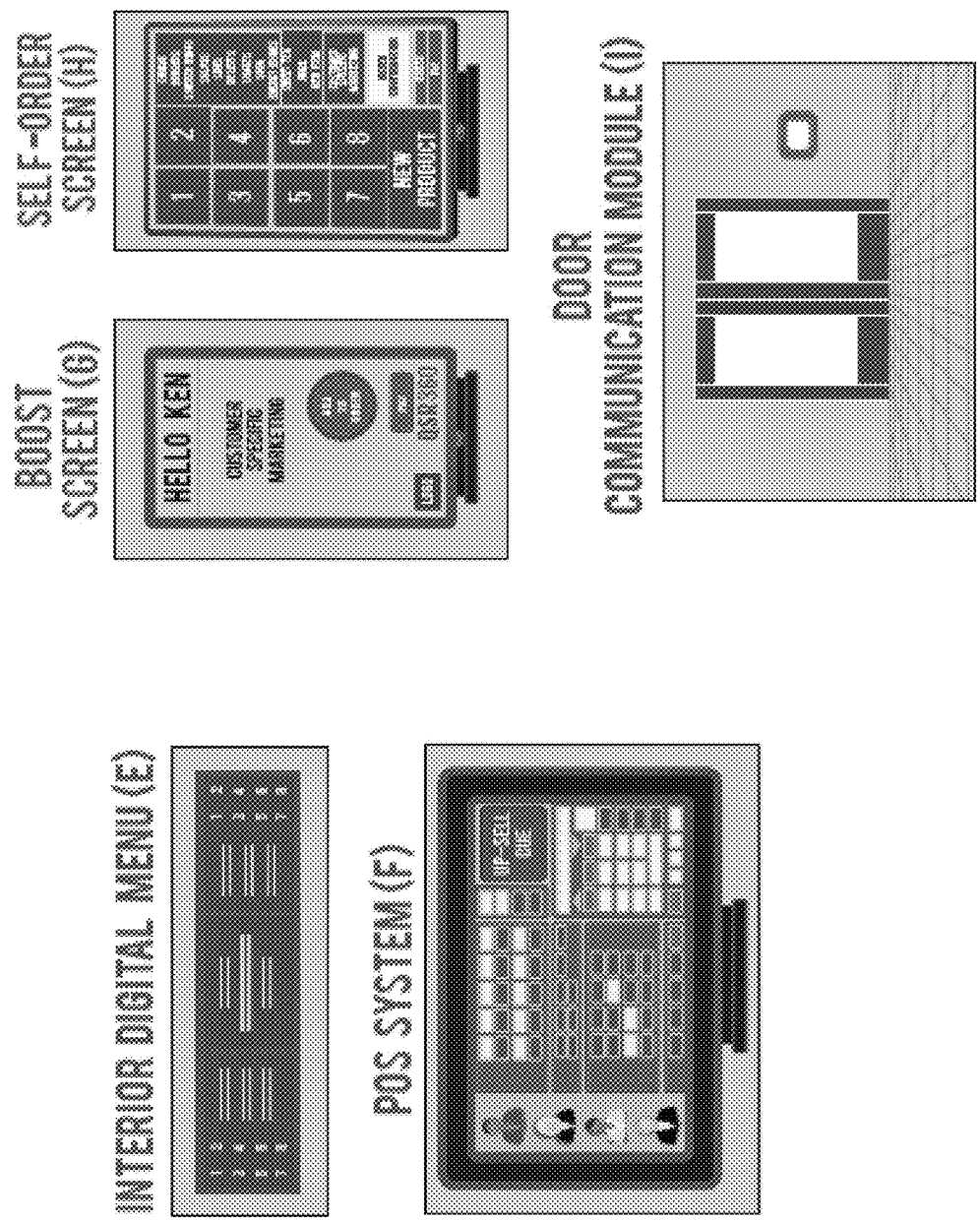
Figure 28:
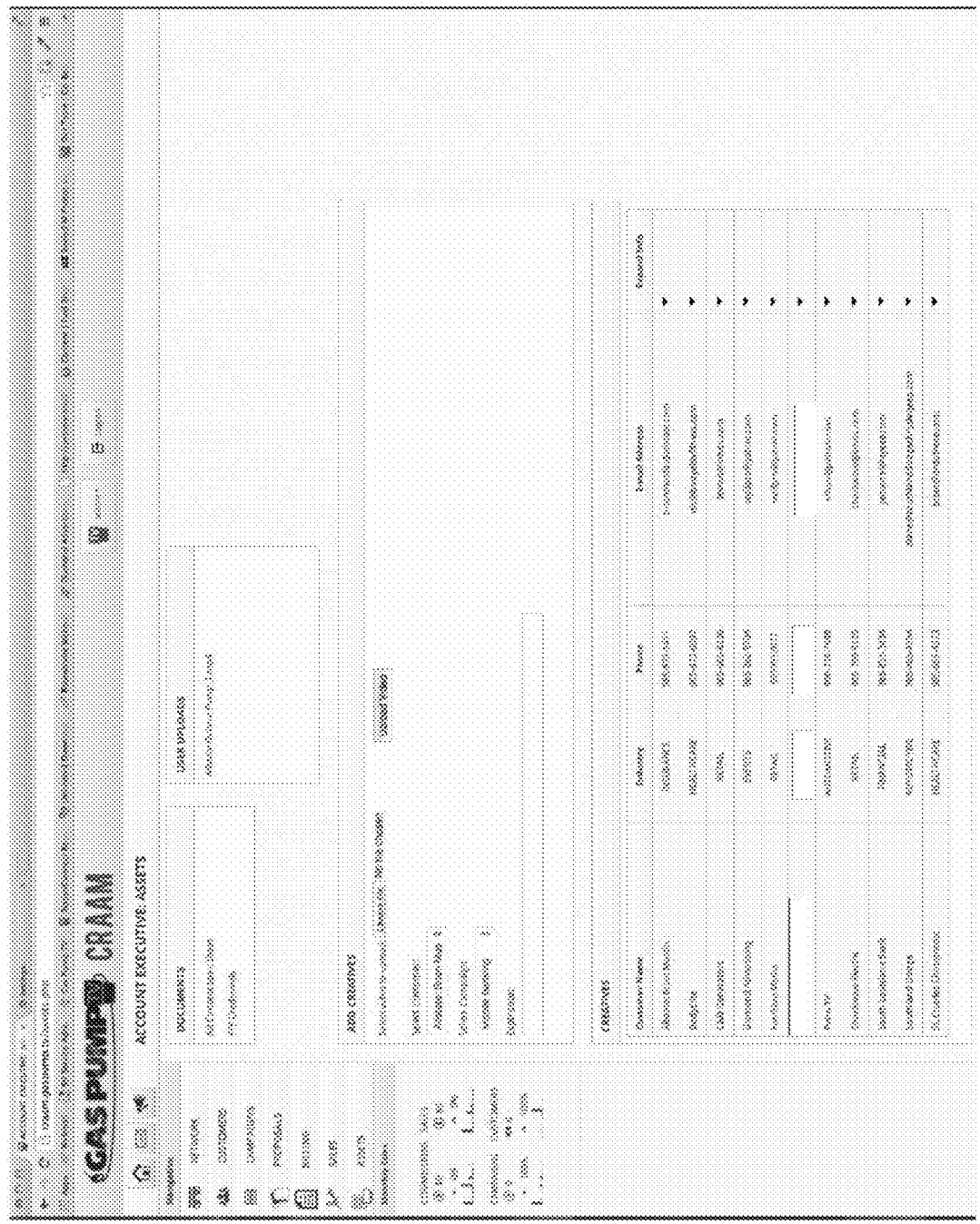
Figure 28:
Figure 30:
Figure 31:
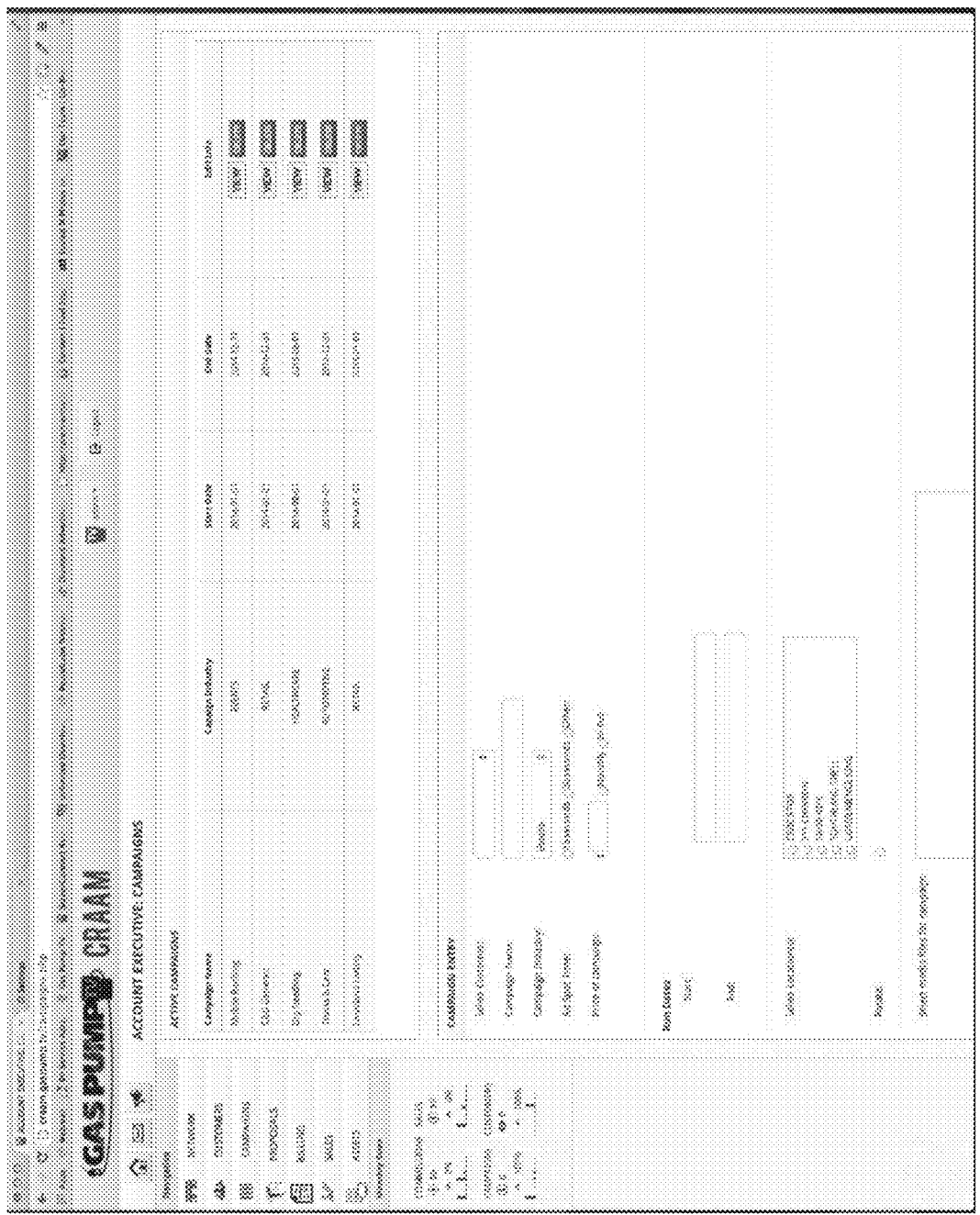
Figure 33:
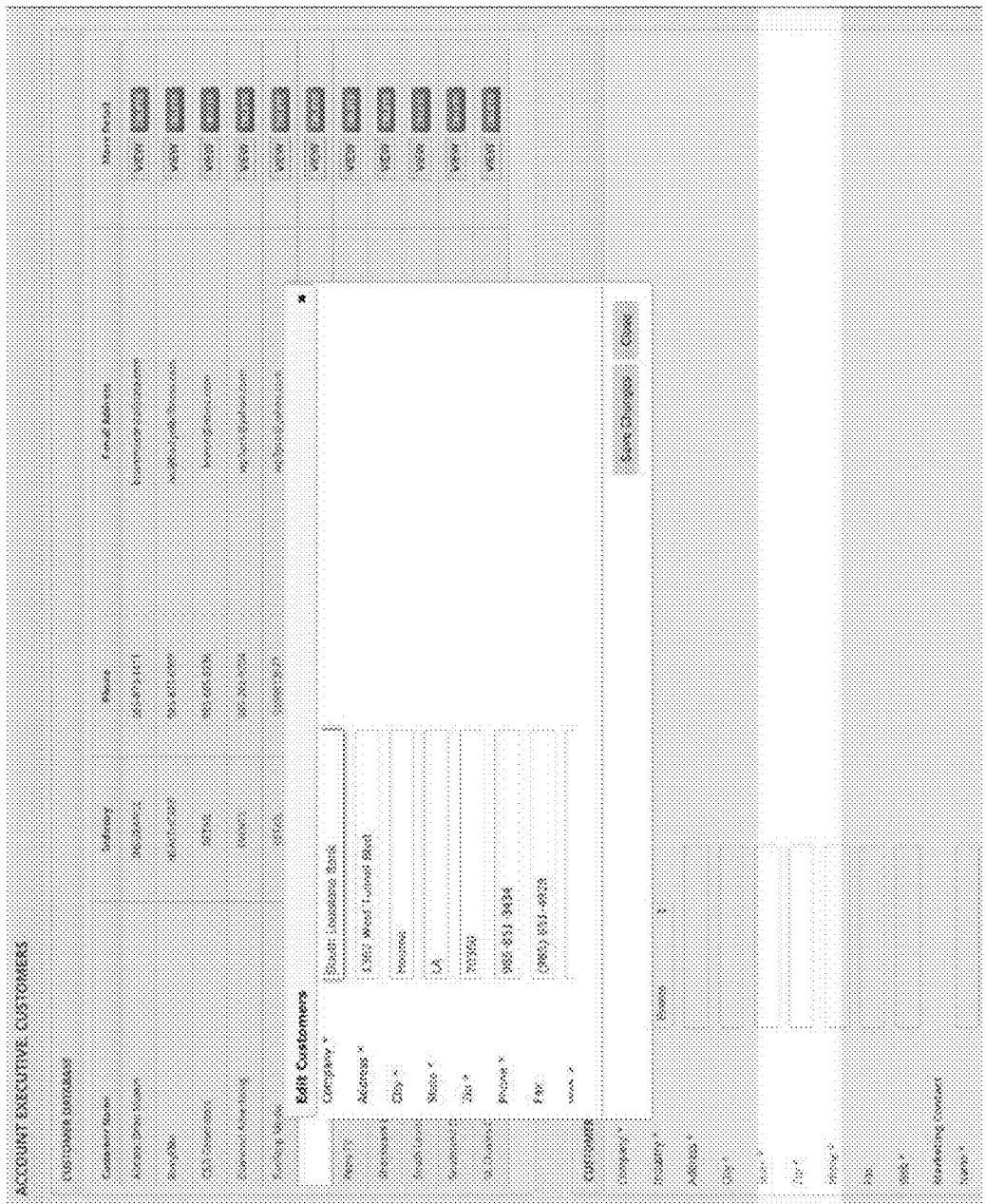
Figure 34:
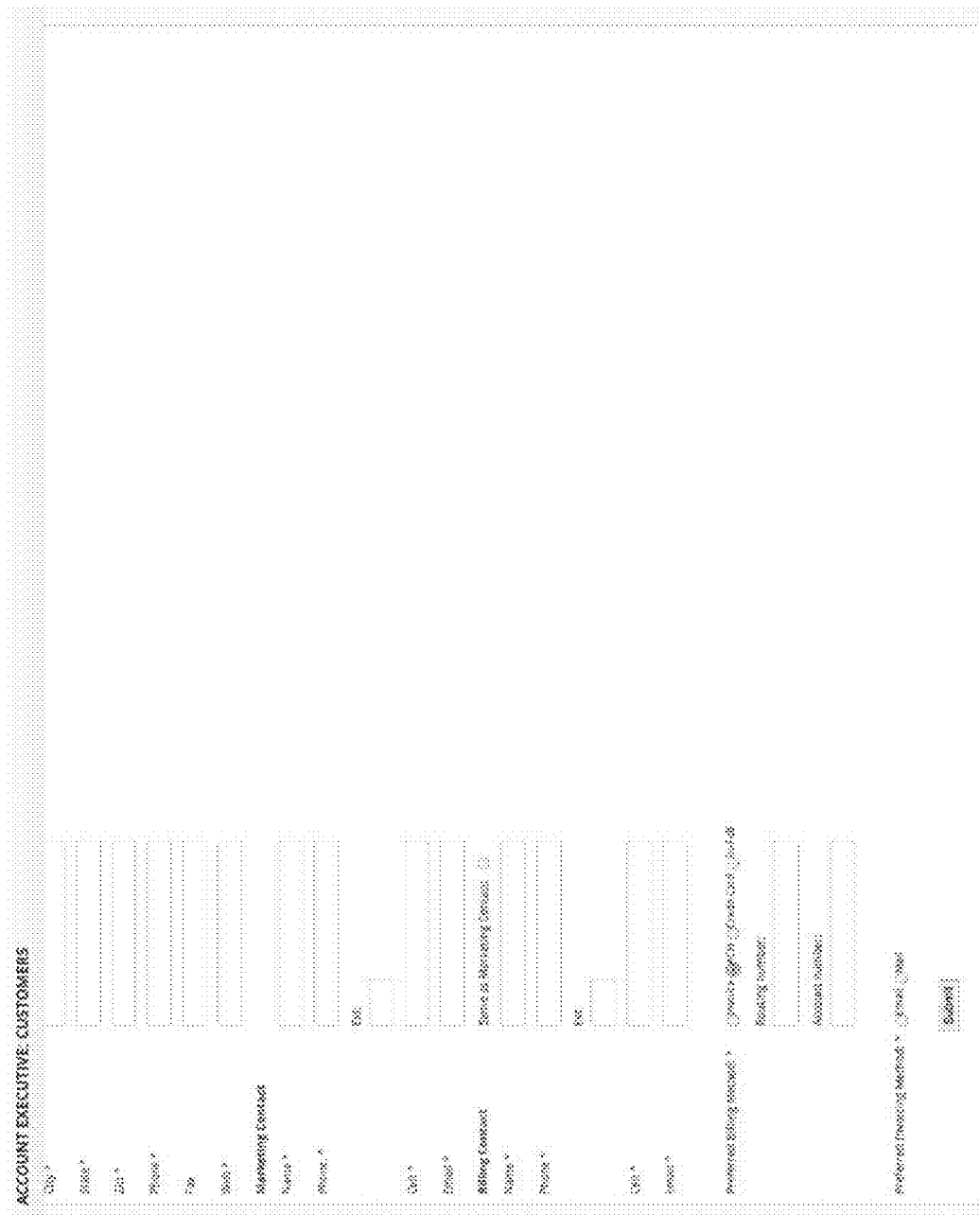
Figure 35:
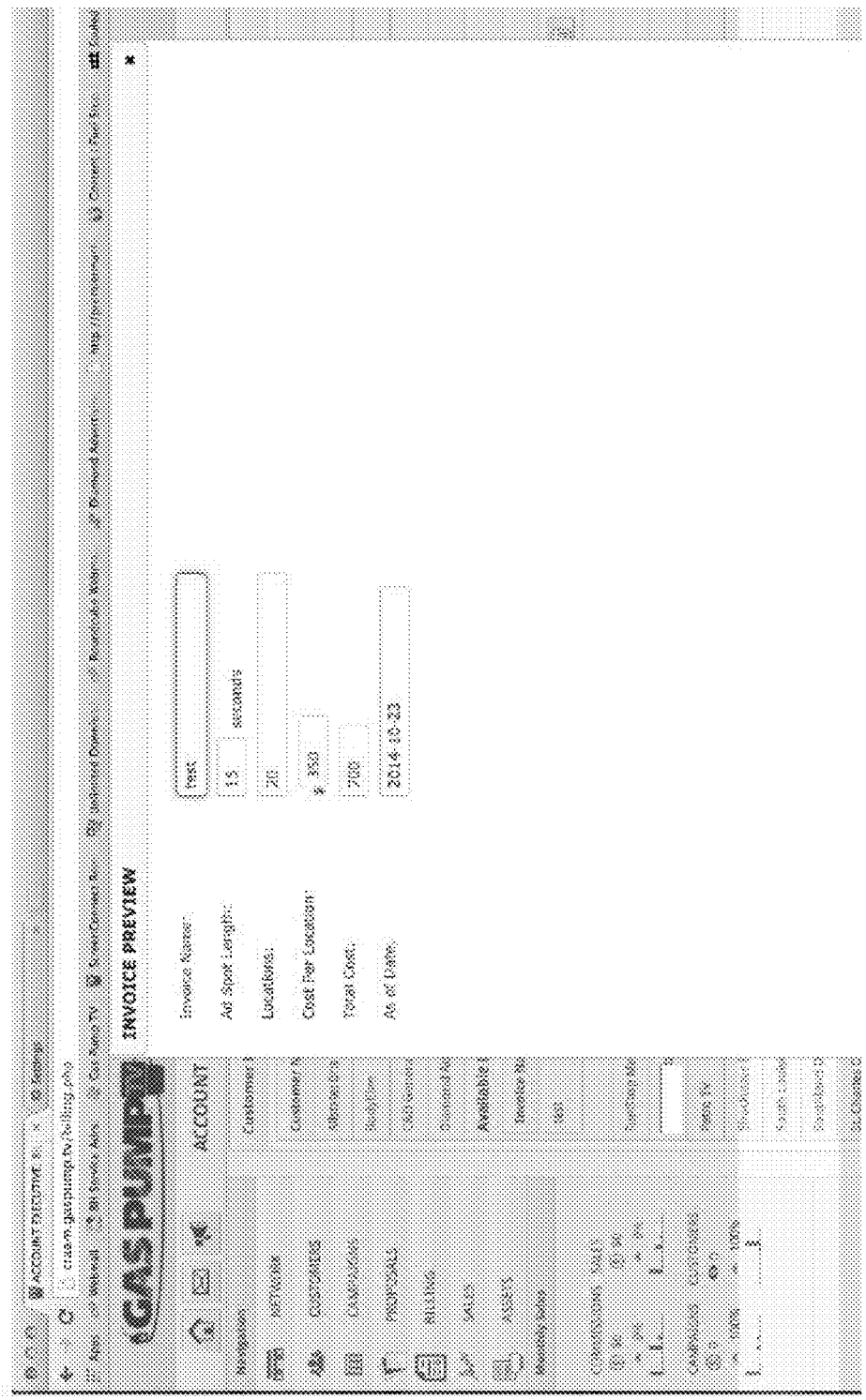
Figure 36:
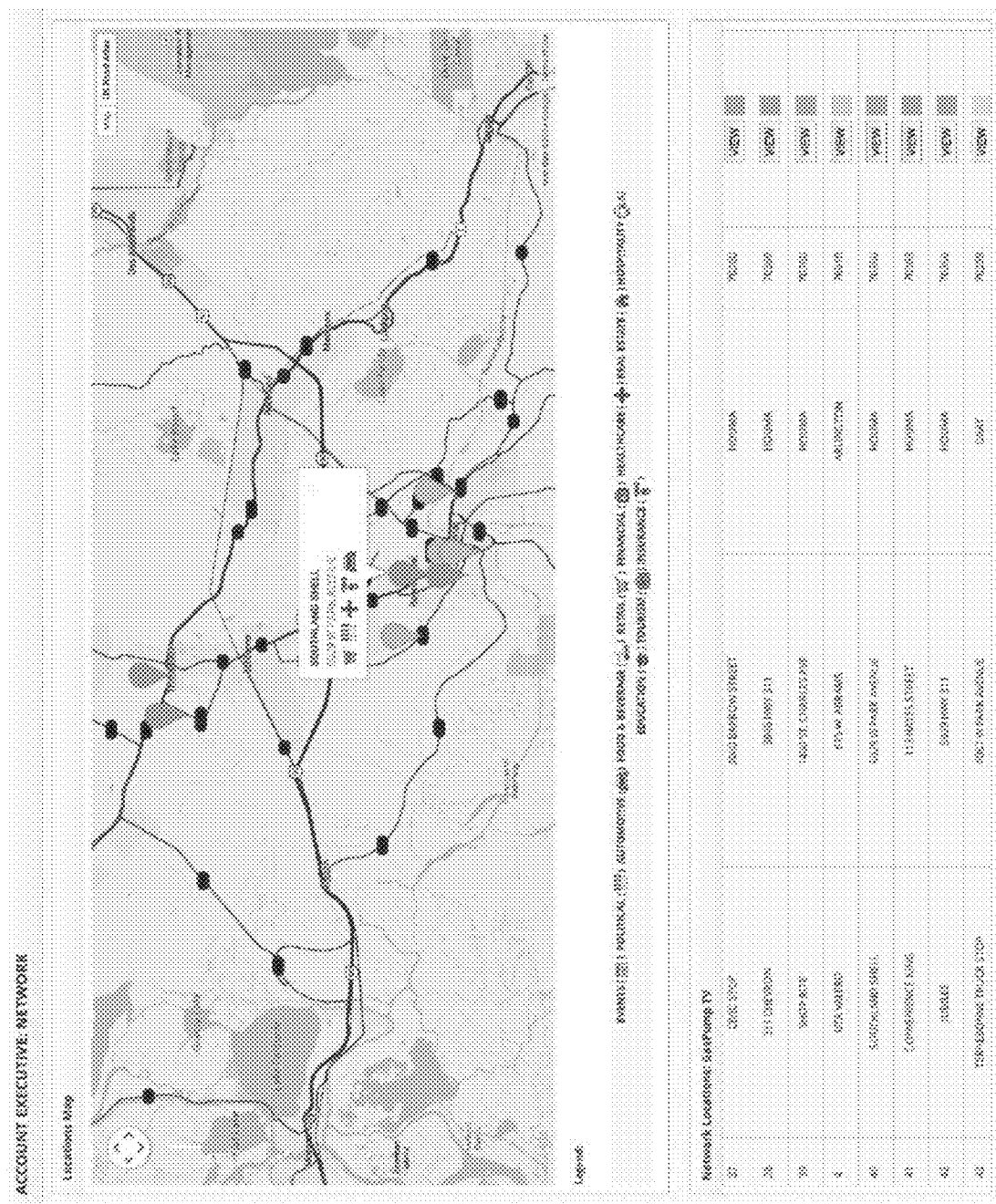
Figure 37:
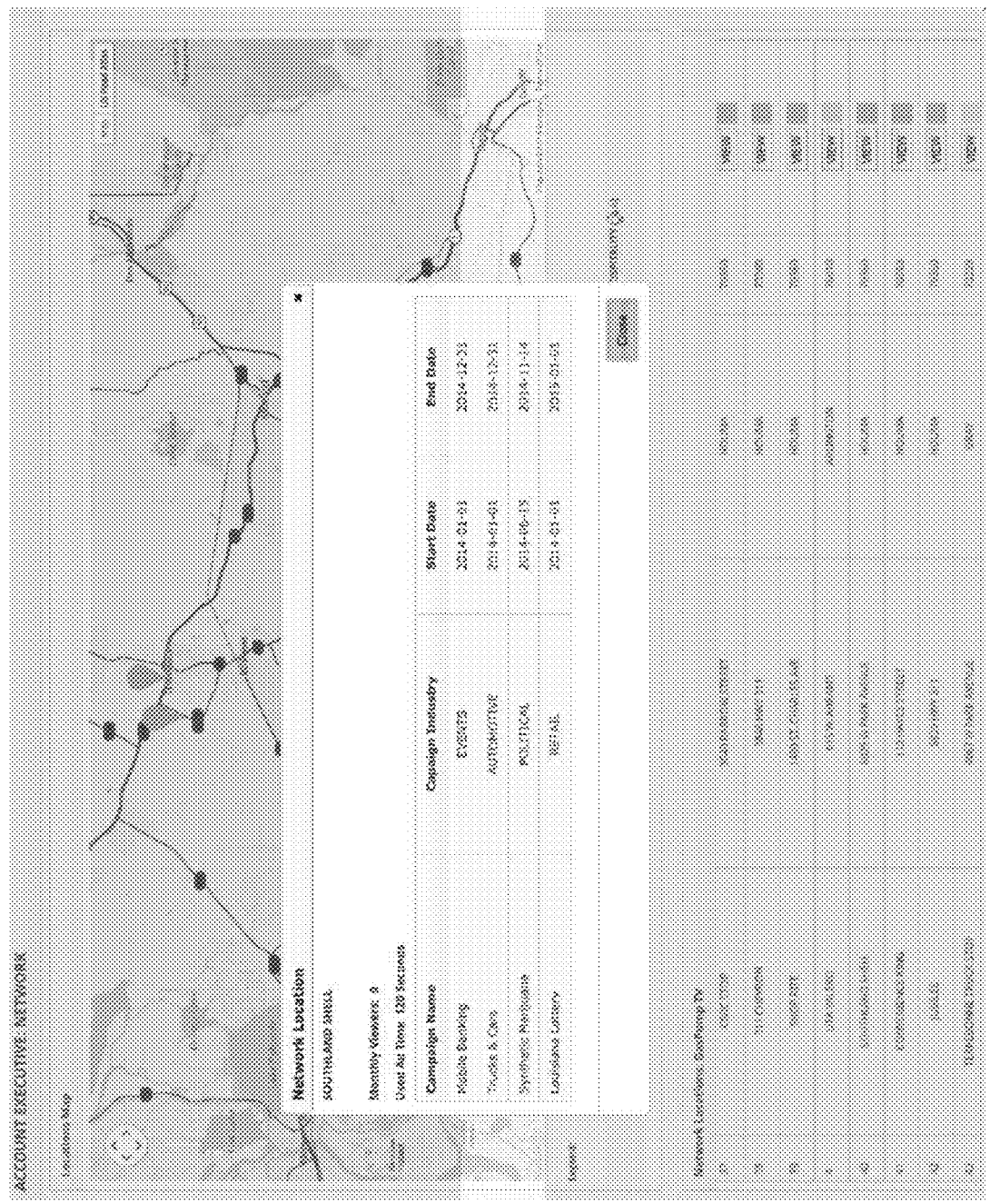
Figure 40:
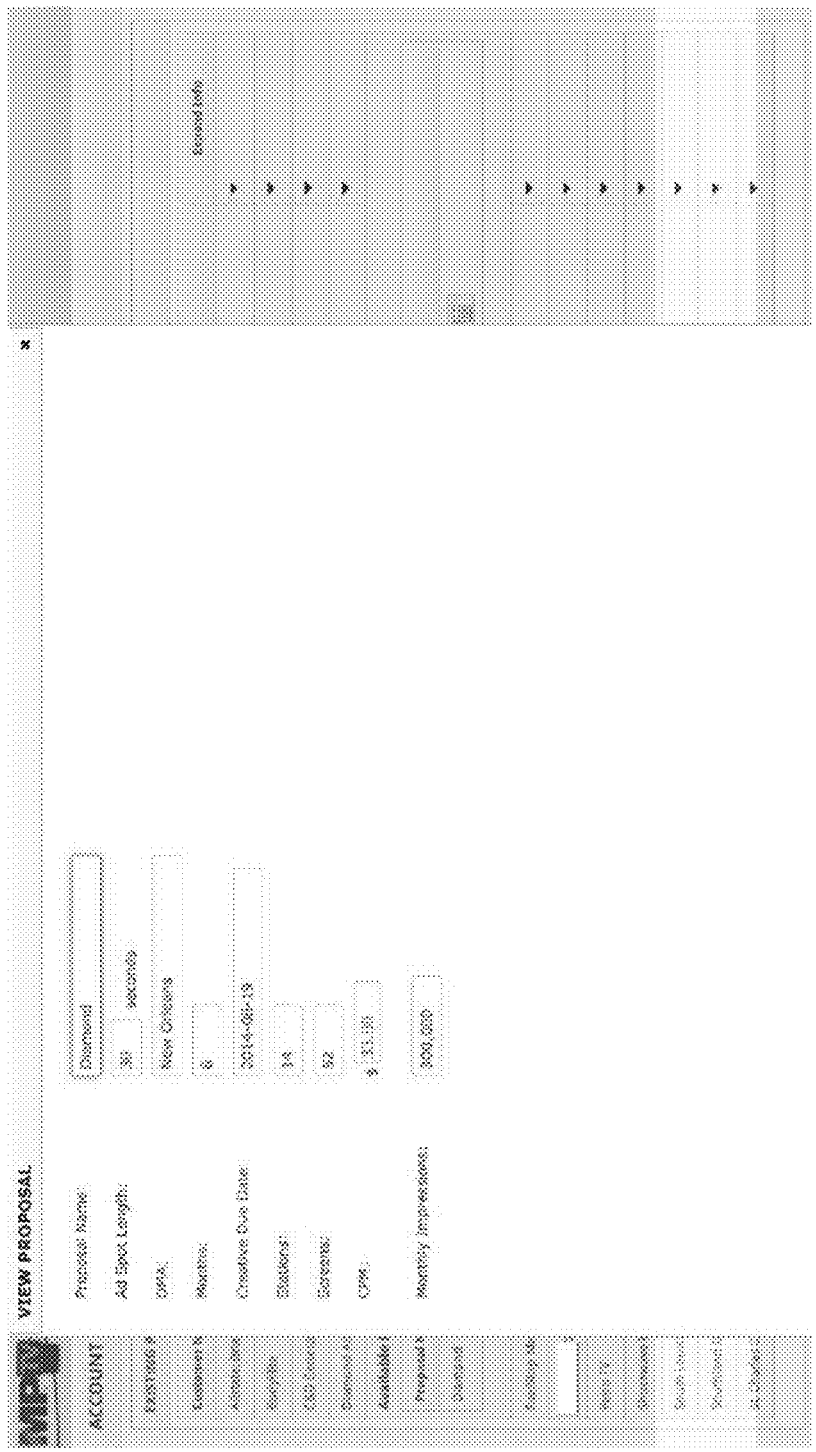
Figure 41:
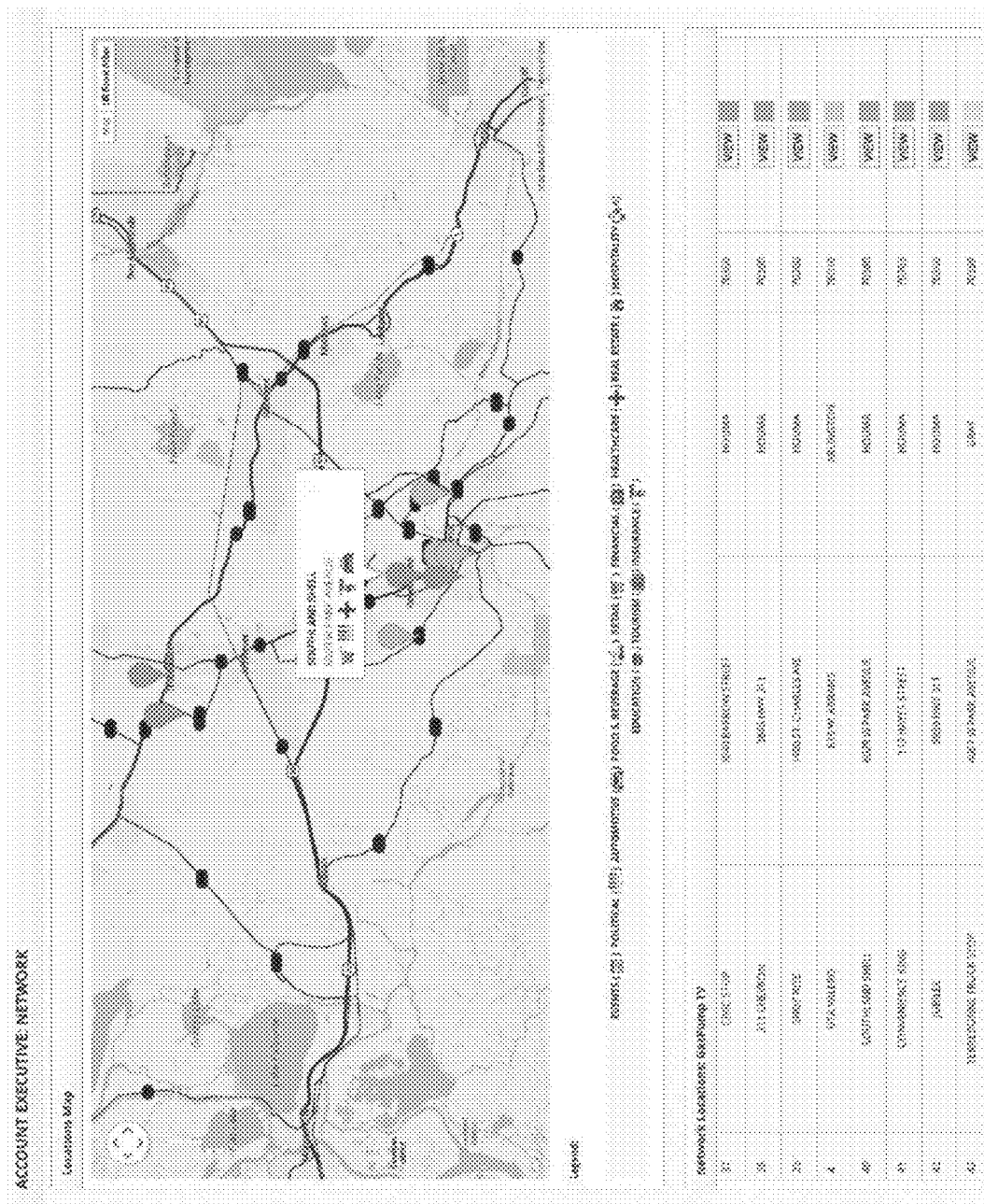
Figure 42:
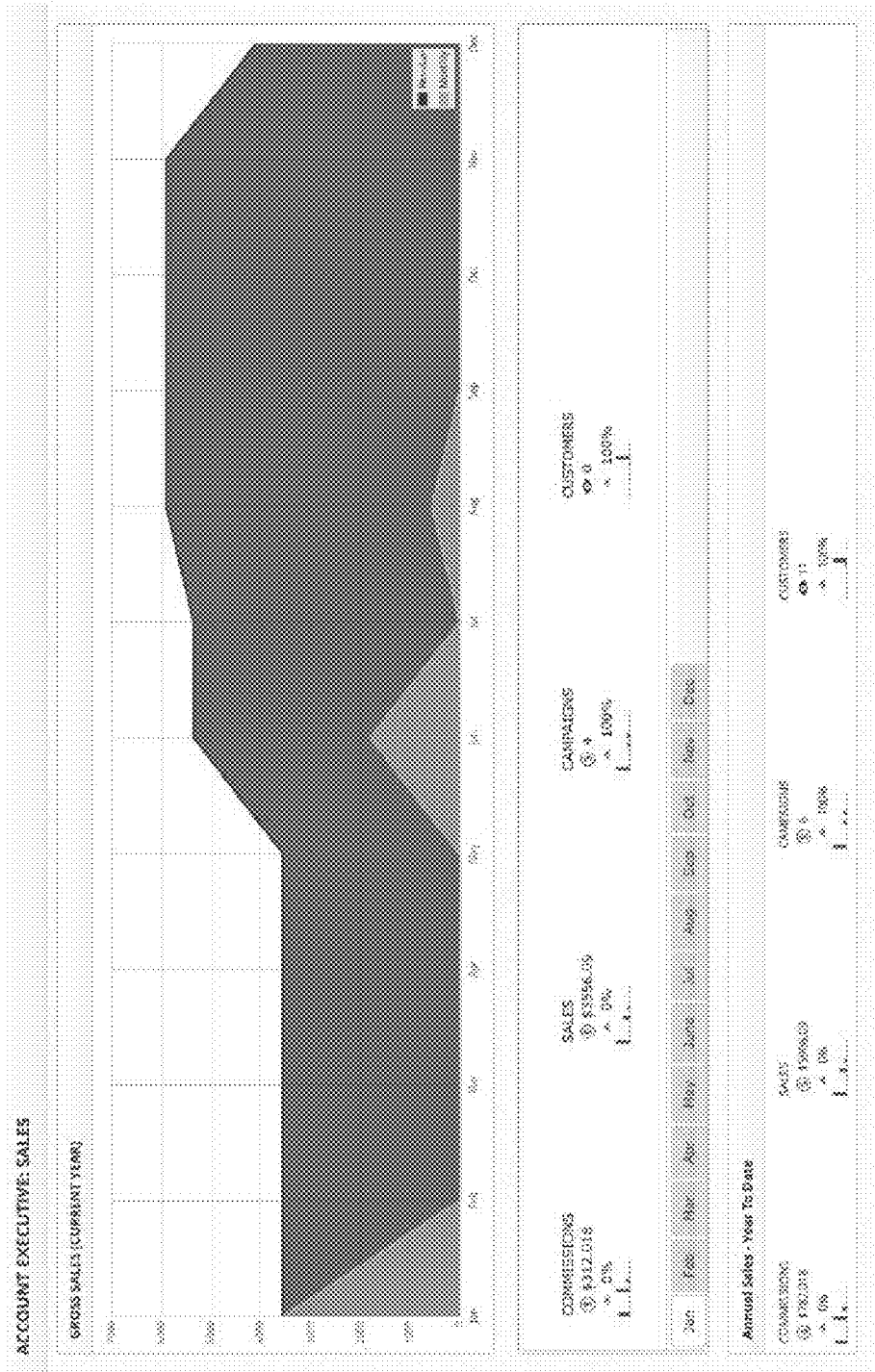

The present invention is not limited to a gas station site configuration, but can be utilized in any space with the paired technologies and integrations contained within this process and deployed in any space or market. FIG. 20 shows an example of a process for a fast food purchase. FIG. 21 shows an example of using the mobile device to purchase an item at a store. FIGS. 22 and 23 show examples of using the mobile device to purchase items within a shopping cart.

For example, components of the system described above may be used for fast food or item purchases, as seen in FIG. 24-27. The system provides consumers the ability to order on the go or online through a mobile app. Once they order, their card is authorized and the monies held in escrow until they arrive at the store, or if a franchise, any location within the franchise. With recognition enabled on their mobile device, consumers are recognized with NFC-BLE and/or geolocation/GPS at the drive-through or in the store at their chosen location. Once they are recognized, their order goes into queue to be served, and their money is taken out of escrow and processed at or for that location's account. Inside the store, the customer's orders go into queue to be served once recognized at a recognition point (which can be the POS register, or near the entry points or any designated area of the store). Upon recognition, the order monies are moved from escrow and payment processed at the location. The user can then simply pick up their order.

If the customer has not elected to pre-order, they have two options. First, they can go to the order-taker and have their order taken. If their integrated app is enabled, they will be recognized and shown customer specific advertising through a customer facing interactive screen (the advertising may be based on their purchase history or profile). If they elect to add an advertised item to their order, they can do so interactively through the screen. Consumers can also pay for their purchase in a contact-free manner with the entry of their customer specific PIN. The integrated mobile app will pay utilizing the payment card which is stored to their account for food and beverage (or a general purchase card). Second, if the customer would like to place their own order, they may do so with one of the self-order screens. Once the customer is the closest to the self-order screen and has an enabled integrated mobile app, they are recognized and provided customer specific marketing based on their purchase history or other factors, as described above. Selected items are shown through the order confirmation area of the self-order screen. Once their selection is complete, they are able to complete their order with the verification of their customer specific pin and the payment processed with their assigned card. If the customer does not have an app, they can still purchase through the self-order screen, by simply swiping a card after their selection is complete. To improve productivity, some locations may have two or more self-order screens with each separately dedicated to a mobile contact-free or swiped transaction payment means, although both can be enabled to handle each type of transaction. After an allotted time, the user becomes inactive during the ordering process and the selections will clear.

Customers passing through the drive-thru that have pre-ordered will be recognized once they reach a certain recognition point in line. Once recognized, their order will be placed in queue, and they may have the ability to add or change their order between assigned recognition receivers when making their way past the menu board. Once they pass the last receiver, their order will be transferred to the store from the system. Customers ordering through the drive thru that have not pre-ordered will be recognized and are able to order, pay, and have their order placed in queue in sequence to where they physically are located in line. When they are recognized and in front of an order menu, they will be shown customer specific marketing. If they have not paid by the time they reach the last menu board, the order-taker will proceed to take their order as usual while being shown customer specific marketing.

Some retailers or franchises may want order confirmations on prepayments beyond recognition described above, so as to provide customers an additional opportunity to confirm or add to their order.

At any point which the customer is not recognized from a pre-paid order they can provide their order number to the order taker which can confirm their order. In all cases where the customer is recognized their order is stored in the system for future reference and analysis. At every screen where the customer interfaces with the system, whether it be outside menu boards, in-store self-order screens, customer-facing interface or "boost" screen, or mobile app, they will receive customer specific marketing. Customer interactive ordering in-store will provide for faster service, shorter lines, less food waste and a personalized user experience.

The system further gives restaurants and vendors the ability to greet the customers by name without asking. Recognized customer information will be available to the order taker for any recognized customer. This may include, but is not limited to, customer name, customer photo, and up-sell cues based on purchase history.

These embodiments, as well as other exemplary embodiments, as well as the tools and programs referenced above, are described in further detail in the attached Appendix (7 pages) which is attached hereto and incorporated herein in its entirety (including all text and figures therein) by reference.

In order to provide a context for the various aspects of the invention, the following discussion provides a brief, general description of a suitable computing environment in which the various aspects of the present invention may be implemented. A computing system environment is one example of a suitable computing environment, but is not intended to suggest any limitation as to the scope of use or functionality of the invention. A computing environment may contain any one or combination of components discussed below, and may contain additional components, or some of the illustrated components may be absent. Various embodiments of the invention are operational with numerous general purpose or special purpose computing systems, environments or configurations. Examples of computing systems, environments, or configurations that may be suitable for use with various embodiments of the invention include, but are not limited to, personal computers, laptop computers, computer servers, computer notebooks, hand-held devices, microprocessor-based systems, multiprocessor systems, TV set-top boxes and devices, programmable consumer electronics, cell phones, personal digital assistants (PDAs), tablets, smart phones, touch screen devices, smart TV, internet enabled appliances, internet enabled security systems, internet enabled gaming systems, internet enabled watches; internet enabled cars (or transportation), network PCs, minicomputers, mainframe computers, embedded systems, virtual systems, distributed computing environments, streaming environments, volatile environments, and the like.

Embodiments of the invention may be implemented in the form of computer-executable instructions, such as program code or program modules, being executed by a computer, virtual computer, or computing device. Program code or modules may include programs, objects, components, data elements and structures, routines, subroutines, functions and the like. These are used to perform or implement particular tasks or functions. Embodiments of the invention also may be implemented in distributed computing environments. In such environments, tasks are performed by remote processing devices linked via a communications network or other data transmission medium, and data and program code or modules may be located in both local and remote computer storage media including memory storage devices such as, but not limited to, hard drives, solid state drives (SSD), flash drives, USB drives, optical drives, and Internet-based storage (e.g., "cloud" storage).

In one embodiment, a computer system comprises multiple client devices in communication with one or more server devices through or over a network, although in some cases no server device is used. In various embodiments, the network may comprise the Internet, an intranet, Wide Area Network (WAN), or Local Area Network (LAN). It should be noted that many of the methods of the present invention are operable within a single computing device.

A client device may be any type of processor-based platform that is connected to a network and that interacts with one or more application programs. The client devices each comprise a computer-readable medium in the form of volatile and/or nonvolatile memory such as read only memory (ROM) and random access memory (RAM) in communication with a processor. The processor executes computer-executable program instructions stored in memory. Examples of such processors include, but are not limited to, microprocessors, ASICs, and the like.

Client devices may further comprise computer-readable media in communication with the processor, said media storing program code, modules and instructions that, when executed by the processor, cause the processor to execute the program and perform the steps described herein. Computer readable media can be any available media that can be accessed by computer or computing device and includes both volatile and nonvolatile media, and removable and non-removable media. Computer-readable media may further comprise computer storage media and communication media. Computer storage media comprises media for storage of information, such as computer readable instructions, data, data structures, or program code or modules. Examples of computer-readable media include, but are not limited to, any electronic, optical, magnetic, or other storage or transmission device, a floppy disk, hard disk drive, CD-ROM, DVD, magnetic disk, memory chip, ROM, RAM, EEPROM, flash memory or other memory technology, an ASIC, a configured processor, CDROM, DVD or other optical disk storage, magnetic cassettes, magnetic tape, magnetic disk storage or other magnetic storage devices, or any other medium from which a computer processor can read instructions or that can store desired information. Communication media comprises media that may transmit or carry instructions to a computer, including, but not limited to, a router, private or public network, wired network, direct wired connection, wireless network, other wireless media (such as acoustic, RF, infrared, or the like) or other transmission device or channel. This may include computer readable instructions, data structures, program modules or other data in a modulated data signal such as a carrier wave or other transport mechanism. Said transmission may be wired, wireless, or both. Combinations of any of the above should also be included within the scope of computer readable media. The instructions may comprise code from any computer-programming language, including, for example, C, C++, C#, Visual Basic, Java, and the like.

Components of a general purpose client or computing device may further include a system bus that connects various system components, including the memory and processor. A system bus may be any of several types of bus structures, including, but not limited to, a memory bus or memory controller, a peripheral bus, and a local bus using any of a variety of bus architectures. Such architectures include, but are not limited to, Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing and client devices also may include a basic input/output system (BIOS), which contains the basic routines that help to transfer information between elements within a computer, such as during start-up. BIOS typically is stored in ROM. In contrast, RAM typically contains data or program code or modules that are accessible to or presently being operated on by processor, such as, but not limited to, the operating system, application program, and data.

Client devices also may comprise a variety of other internal or external components, such as a monitor or display, a keyboard, a mouse, a trackball, a pointing device, touch pad, microphone, joystick, satellite dish, scanner, a disk drive, a CD-ROM or DVD drive, or other input or output devices. These and other devices are typically connected to the processor through a user input interface coupled to the system bus, but may be connected by other interface and bus structures, such as a parallel port, serial port, game port or a universal serial bus (USB). A monitor or other type of display device is typically connected to the system bus via a video interface. In addition to the monitor, client devices may also include other peripheral output devices such as speakers and printer, which may be connected through an output peripheral interface.

Client devices may operate on any operating system capable of supporting an application of the type disclosed herein. Client devices also may support a browser or browser-enabled application. Examples of client devices include, but are not limited to, personal computers, laptop computers, personal digital assistants, computer notebooks, hand-held devices, cellular phones, mobile phones, smart phones, pagers, digital tablets, Internet appliances, and other processor-based devices. Users may communicate with each other, and with other systems, networks, and devices, over the network through the respective client devices.

All references cited in this specification are herein incorporated by reference as though each reference was specifically and individually indicated to be incorporated by reference. The citation of any reference is for its disclosure prior to the filing date and should not be construed as an admission that the present invention is not entitled to antedate such reference by virtue of prior invention.

It will be understood that each of the elements described above, or two or more together, may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only, and the scope of the present invention is to be limited only by the following claims.

The invention claimed is:

1. A system for managing and processing a consumer transaction, comprising a gas fuel pump, a high-definition video pump topper affixed to a first position on said gas fuel pump, a consumer interface screen affixed to a second position on said gas fuel pump and separated from said video pump topper, wherein said consumer interface screen is in electronic communication with said video pump topper, prompts the consumer to engage in a consumer transaction or opportunity, and receives input from said consumer when said consumer engages in said consumer transaction or opportunity.

2. The system of claim 1, wherein the system includes a fuel media network, said network providing campaign, retailer, advertiser, affiliate, and manager functions and interfaces.

3. The system of claim 1, further including a media distribution unit with a storage device for media, a transmitter, a cooling system, and a back-up battery;
   wherein the media distribution unit is adapted to provide media distribution and content deliver to one or more high-definition video pump toppers affixed to one or more gas fuel pumps.

* * * * *